United States Patent
Schenck et al.

(10) Patent No.: US 10,457,355 B2
(45) Date of Patent: Oct. 29, 2019

(54) MOTILE BUOYANCY DEVICE INCLUDING NON-NEWTONIAN MATERIAL

(71) Applicant: Renoun, LLC, Shelburne, VT (US)

(72) Inventors: Cyrus King Schenck, Shelburne, VT (US); Lane Warren Kessler, N. Ferrisburg, VT (US)

(73) Assignee: Renoun, LLC, Shelburne, VT (US)

( * ) Notice: Subject to any disclaimer, the term of this patent is extended or adjusted under 35 U.S.C. 154(b) by 109 days.

(21) Appl. No.: 15/712,593

(22) Filed: Sep. 22, 2017

(65) Prior Publication Data

US 2018/0086420 A1 Mar. 29, 2018

Related U.S. Application Data

(60) Provisional application No. 62/495,824, filed on Sep. 26, 2016.

(51) Int. Cl.
| | |
|---|---|
| B63B 1/28 | (2006.01) |
| B63B 1/24 | (2006.01) |
| B63B 5/24 | (2006.01) |
| B63B 1/32 | (2006.01) |

(52) U.S. Cl.
CPC .............. B63B 1/28 (2013.01); *B63B 1/248* (2013.01); *B63B 1/32* (2013.01); *B63B 5/24* (2013.01); *B63B 2207/02* (2013.01)

(58) Field of Classification Search
CPC ......................................... B63B 1/28
USPC ......................................... 428/57
See application file for complete search history.

(56) References Cited

U.S. PATENT DOCUMENTS

| | | | |
|---|---|---|---|
| 3,289,623 | A | 12/1966 | Gray et al. |
| 4,199,909 | A | 4/1980 | Kotcharian |
| 5,449,553 | A | 9/1995 | Griffith |
| 5,891,942 | A | 4/1999 | Parish et al. |
| 6,863,973 | B2 | 3/2005 | Tomokuni et al. |
| 7,118,699 | B2 | 10/2006 | Lauersdorf et al. |
| 7,608,655 | B2 | 10/2009 | Lauersdorf et al. |
| 8,646,371 | B2 | 2/2014 | Fisher et al. |
| 8,784,011 | B2 | 7/2014 | Collins |
| 9,068,622 | B2 | 6/2015 | Malchev et al. |
| 2008/0233356 | A1 | 9/2008 | Loher et al. |
| 2012/0024138 | A1 | 2/2012 | Carberry et al. |
| 2012/0145066 | A1 | 6/2012 | King |
| 2013/0017743 | A1* | 1/2013 | Green ............ B63B 35/7906 441/79 |
| 2016/0046857 | A1 | 2/2016 | Collins |

FOREIGN PATENT DOCUMENTS

| | | |
|---|---|---|
| CA | 2369814 C | 4/2009 |
| GB | 1248351 A | 3/1969 |
| GB | 2313560 A | 5/1996 |
| WO | 201239706 A2 | 3/2012 |

* cited by examiner

*Primary Examiner* — Brent T O'Hern
(74) *Attorney, Agent, or Firm* — Caldwell Intellectual Property Law

(57) ABSTRACT

A motile buoyancy apparatus for use in a fluid. The motile buoyancy apparatus includes an outer layer, the outer layer having a performance surface. The motile buoyancy apparatus includes at least a portion including a first material. The first material is a non-Newtonian material. The at least a portion causes the performance surface to exhibit a shear rate-variable shear response.

20 Claims, 15 Drawing Sheets

MOTILE BUOYANCY DEVICE INCLUDING NON-NEWTONIAN MATERIAL

RELATED APPLICATION DATA

This application claims the benefit of priority of U.S. Provisional Patent Application Ser. No. 62/495,824, filed on Sep. 26, 2016, and titled "Water device incorporating a non-Newtonian or dilatant material," which is incorporated reference herein in its entirety.

FIELD OF THE INVENTION

The present invention generally relates to the field of buoyancy devices. In particular, the present invention is directed to a motile buoyancy device including non-Newtonian material.

BACKGROUND

Technologies for navigation, labor, and recreation in water are constantly evolving to address the many challenges and opportunities aquatic environments present. At every level of travel in and on water, designers and engineers strive to improve speed, energy efficiency, maneuverability, safety, and control. Ships must transport maximal quantities of goods with minimal energy expenditures, while resisting the deleterious effects of storms and rogue waves. At the other extreme, surfboards have been subjected to centuries of modification, material experimentation, and artistic skill to strike a similar balance between speed, handling, maneuverability, and durability. At the extremes of performance, watercraft and water recreation products maximize desirable traits at the expense of other crucial attributes, often leading to critical failures when faced with unexpected events; thus, hulls built for great speed may require great expertise to handle, and may shatter upon collision, while hulls built for great durability may be cumbersome and slow, driving up fuel costs and ironically endangering occupants in inclement weather. This leaves designers with the unenviable choice of choosing the shortcomings of their designs for the benefit of the advantages, and leaves those who seek employment or recreation on the water to choose between various flawed options.

SUMMARY OF THE DISCLOSURE

In one aspect, a motile buoyancy apparatus for use in a fluid is presented. The motile buoyancy apparatus includes an outer layer. The outer layer includes a performance surface. The motile buoyancy apparatus includes at least a portion including a first material. The first material is a non-Newtonian material. The at least a portion including the first material causes the performance surface to exhibit a shear rate-variable shear response.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1A:
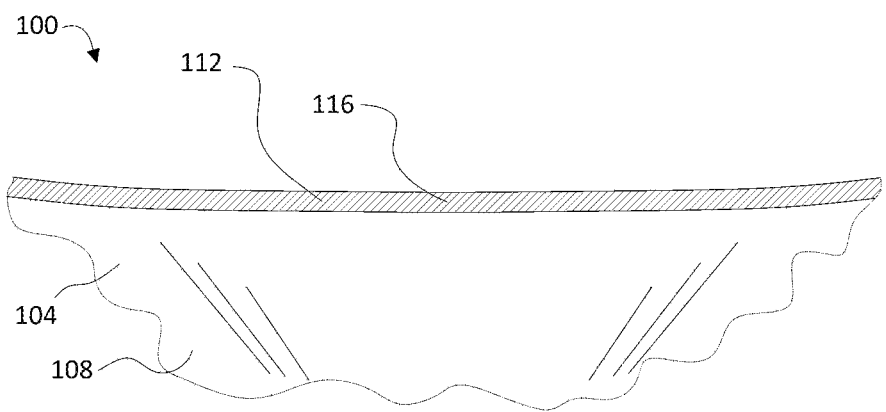
FIG. 1A is a perspective drawing illustrating a portion of an exemplary motile buoyancy device in an embodiment.

In one aspect, the present invention is directed to a motile buoyancy apparatus, such as a watercraft or water recreation board. The motile buoyancy apparatus incorporates a non-Newtonian material so as to affect the material behavior in which the outer surface that interfaces with water. In particular, the non-Newtonian material causes the outer surface to resist shear forces differently at different shear rates. As a result, the outer surface may respond with greater rigidity or greater flexibility to a rapid impact or change in shear stresses than to slower impacts or changes in shear stresses. This may allow the motile buoyancy apparatus to behave differently under different circumstances; for instance, the motile buoyancy apparatus may be somewhat flexible with regard to typical seas, absorbing the kinetic energy of calm to moderate waves in its flexion and enhancing long-term durability, while stiffening to better absorb force in the face of more rapid impacts imposed by storms and rogue waves. As another example, a surfboard may be constructed with a thin design allowing higher velocities or quicker turns, while having enhanced stress-absorption properties granted by inclusion of dilatant materials. These and other advantageous uses of non-Newtonian materials in embodiments of motile buoyancy apparatuses are described in further detail in the ensuing disclosure.

Non-Newtonian materials have properties that distinguish them from other materials. As used herein, non-Newtonian materials are materials having a shear response that varies by shear rate. When subjected to an increase rate of shear deformation, non-Newtonian materials undergo a change in apparent rigidity and/or apparent viscosity. Non-Newtonian materials as described herein may belong to one of two general classifications: (1) non-Newtonian materials classified as pseudoplastic or shear-thinning materials demonstrate decreased apparent rigidity and/or apparent viscosity in response to an increasing shear rate; and (2) non-Newtonian materials classified as dilatant or sheer-thickening materials demonstrate decreased apparent rigidity and/or apparent viscosity in response to an increasing shear rate. For example, a dilatant material may behave like low viscosity fluid under small or absent shear deformation, but behave as a highly viscous fluid under higher rates of shear deformation. Other dilatant materials may behave as a solid or quasi-solid material when subjected to high rates of shear deformation, while behaving as a low-viscosity fluid under low or absent shear deformation. Still other dilatant materials may behave as flexible or elastomeric solids or quasi-solids when subjected to little or no shear deformation, but as highly rigid solids under high shear deformation rates.

The normal or resting condition of a non-Newtonian material (i.e., the condition where the non-Newtonian material is experiencing little or no shear deformation) and the opposite or ending point where the non-Newtonian material is subjected to a high rate of shear deformation may define the endpoints of a portion of a spectrum; one end of the spectrum may be described as "fluidity," while the other may represent "rigidity." Some non-Newtonian materials may cover the full range of the spectrum, while others may cover only part of the spectrum. For instance, a non-fluid non-Newtonian material may range from soft, elastic or flexible at one extreme along the spectrum to a rigid solid at the other end, but may not arrive at a fluid or apparently fluid form, at least in the temperature range in which it is tested; the non-fluid non-Newtonian material in this example may still be defined as lying on the spectrum, as its softer extreme is closer in form to fluid than its more rigid extreme. Adjustment of forces that act on a non-Newtonian material, the types of ingredients in the non-Newtonian material, or the quantities of ingredients in the non-Newtonian material may shift the region on the spectrum represented by the non-Newtonian material toward the rigid or fluid end of the spectrum, or increase or decrease the span of the region on the spectrum for that material. As an example, a dilatant material subjected to a high rate of shear deformation may be driven in the direction of rigidity on the spectrum, while cessation of the shear deformation may drive the material toward fluidity.

As movement along the spectrum is affected by shear rate, the timescale over which shear force is applied to a non-Newtonian material may affect its movement along the spectrum. For instance, a gradually applied shear force to a dilatant material may result in a small or negligible increase in viscosity or rigidity, while a shear force applied rapidly may result in a drastic increase in viscosity or rigidity. As an example, a dilatant suspension of cornstarch in water, sometimes known as "Oobleck," may support a person stepping rapidly or "dancing" on its surface, while allowing a person who stands or walks slowly on the surface to sink into the material; the opposite effect is observed in water-impregnated "quick-sand," which demonstrates pseudoplastic properties, causing a swimmer trapped in the quicksand to sink faster when struggling harder. Timescale limits under which non-Newtonian behavior is observable may depend upon various factors, including characteristics of the force applied to the material, and the type of non-Newtonian material involved.

Non-Newtonian materials may be modeled according to a "power law," wherein the apparent viscosity of the material, defined as viscosity in liquids or more generally viscosity-like resistance to shear forces, is characterized by the equation $\eta = K\dot{\gamma}^{n-1}$, where $\eta$ is the apparent viscosity of the material, K is a positive material-specific constant, and $\dot{\gamma}$ is the applied shear rate. Where n is less than 1, the material represented in the equation is pseudoplastic, and the apparent viscosity of the material is proportional to a negative power of the applied shear rate. Where n is greater than 1, the material represented in the equation is dilatant, and the apparent viscosity of the material is proportional to a positive power of the applied shear rate. Note that the positive power may be a non-constant positive power; that is, the positive power may be approximately constant or may vary while still exceeding zero. For instance, (n−1) may vary between 0.5 and 3, but remain greater than zero, and still be considered a positive power for the purposes herein. Similar variations may be observed with regard to negative powers. Persons skilled in the art will also be aware that material properties of any material can be described by a single equation only within a limited range of parameters, and that a property described for a material is described for the material as subjected to parameters of typical use; thus, for instance, a dilatant material used in a motile buoyancy apparatus is a material exhibiting shear-thickening behavior within the range of temperatures and forces to which that form of motile buoyancy apparatus is subjected during intended use, i.e. during motion through or navigation through the range of forces and impacts presented by bodies of water. Similarly, a material described as elastic is a material that behaves in an elastic manner within the intended range of temperatures and forces, and, for instance, may become rigid at very low temperatures, fluid at very high temperatures, and unable to rebound from excessive forces.

Various mechanisms may cause dilatant behavior in a material, independently or in combination. In shear-induced ordering, alignment of particles in the dilatant material may increase as a shearing force is applied; increasingly aligned particles may behave in an increasingly rigid manner. In addition, or alternatively, particles within the dilatant material maybe ordered at low shear rates, and become increasingly disordered at higher shear rates, resulting in greater apparent viscosity or rigidity. Another factor which may contribute to dilatant behavior may be change in volume of one or more ingredients, such as molecules whose volume expands under shear forces; this increase in volume may increase apparent rigidity or viscosity of dilatant material. Another factor which may increase apparent rigidity and/or apparent viscosity in dilatant material may be friction between particles that increases with increased shear rate, inhibiting movement of particles past each other. An additional factor that may increase apparent viscosity or apparent rigidity with increased shear rate may be attraction between molecules that increases with application of shear force. Another factor that may cause dilatant behavior may be a shear force overcoming repulsive forces between particles, allowing them to clump together. In suspensions of particles in liquids or gels, increases in shear rate may cause micro assembly clusters that increase resistance to shear and viscosity.

An additional factor that may cause dilatant behavior may be observed in certain polymeric materials, wherein shear-induced crosslinking between molecular elements may increase viscosity and/or resistance to shear force. Another factor that may contribute to dilatant behavior may be the formation of shear-induced non-Gauss chains in polymeric materials. An additional factor that may contribute to dilatant behavior in polymeric materials may be the formation of space network structure in response to shear rate increases. It should be understood that the above list of interactions and mechanisms is not intended to be exhaustive, and that shear thickening behavior may be the result of any phenomenon or interaction, or combination of phenomena or interactions including those listed above and any others, as would be apparent to one skilled in the art. A non-limiting example of a dilatant polymer material is polyborodimethylsiloxane and chemical and physical analogs thereof.

In some embodiments, decrease in shear rate, for instance by reduction or removal of shearing force, may have the opposite effect in non-Newtonian material of increasing shear rate. For example, a dilatant material under a high shearing force may be apparently solid or viscous, and may become increasingly soft or fluid as the shearing force is reduced or removed. A pseudoplastic material may become increasingly stiff or viscous as a shearing force is reduced or removed.

Several categories of non-Newtonian materials will now be described. It should be understood that this list is not intended to be exhaustive, and any suitable types of dilatant material are contemplated for use in the disclosed embodiments.

Non-Newtonian materials may include non-Newtonian fluids. A dilatant fluid may possess the characteristics of a fluid until it encounters a shear force, whereupon the dilatant fluid will thicken (e.g., move toward rigidity), and behave more like a higher viscosity fluid, quasi-solid, or solid. The shear force may be supplied by any suitable form of agitation, including without limitation direct or indirect impact of an object against the dilatant fluid. The dilatant fluid may return to a lower-viscosity or more liquid state upon cessation or reduction of the shear force. Dilatant fluid may include a colloid, composed of suspended particles in a liquid medium. A non-limiting example of a liquid medium may be polyethylene glycol; a non-limiting example of particles suspended in the liquid medium may be silica particles. Any suitable medium or particles may be used. In the absence of shear force, or when being acted on by shear forces applied slowly, the particles may float freely in the liquid medium without clumping or settling, owing to a slight mutual repulsion between the particles. An increase in shear rate, for instance due to a sudden impact, may overcome the repulsion, allowing the particles to clump together, increasing viscosity or apparently solid properties. When the shear rate decreases, the repulsion may push the clumps apart, causing fluid-like behavior again.

Conversely, a pseudoplastic fluid may possess the characteristics of a higher-viscosity fluid, solid, or quasi-solid until it encounters a shear force, whereupon the pseudoplastic fluid will thin (e.g., move away from rigidity), and behave more like a lower viscosity fluid, or softer solid or quasi-solid. Non-Newtonian fluids may be used to make films, resins, finishes, and coatings that exhibit dilatant behavior. Non-Newtonian fluids may be incorporated in adhesives, such as glue or epoxy. Persons skilled in the art will be familiar with methods used to make films, finishes, and coatings using fluids.

Non-Newtonian materials may include dilatant gels. Non-Newtonian gels may have the characteristics of high-viscosity fluids, quasi-solids, or intermediate forms. Non-Newtonian gels may have a similar composition to non-Newtonian fluids, but may exhibit higher apparent viscosity or rigidity. In some embodiments, non-Newtonian gels have the same ingredients as non-Newtonian fluids, but may exist in a gel form due to one or more of various factors, including additional ingredients that cause the liquid medium to become gelatinous or environmental conditions. Non-Newtonian gels may exhibit similar qualities to jellies, putties, or clays. At low or absent shear rates, dilatant gels may be deformed with application of little or no force, while at higher shear rates such as those resultant from the energy of a sudden impact, dilatant gels may become increasingly rigid, with an improving resistance to deformation. The mechanisms that cause dilatant behavior in other dilatant materials may cause dilatant behavior in dilatant gels. At low or absent shear rates, pseudoplastic gels may be rigid, with a strong resistance to deformation, while at higher shear rates may be more readily deformed. The mechanisms that cause pseudoplastic behavior in other pseudoplastic materials may cause pseudoplastic behavior in pseudoplastic gels.

Non-Newtonian fluids or gels may be encapsulated to produce another non-Newtonian material. Encapsulated non-Newtonian fluids or gels may include containers filled with non-Newtonian fluids or gels. Containers may include one or more flexible or rigid walls; walls may also be constructed wholly or in part of non-Newtonian material. Containers may be designed to receive vibrations or impact forces and transmit the vibrations or impact forces to the non-Newtonian fluid or gels. The resulting increase in viscosity or rigidity of enclosed dilatant fluids or gels may cause the apparent rigidity of the containers to increase, while the enclosed pseudoplastic fluids or gels may respond with a decrease in apparent rigidity.

Non-Newtonian foams are another kind of non-Newtonian material. Non-Newtonian foam may be formed by confining physically or chemically produced bubbles of gas in non-Newtonian gel or fluid. The resulting material may be solidified. Non-Newtonian foam may have similar behavior to other non-Newtonian materials; for instance, increased shear rate caused by a sudden impact or other event may cause dilatant foam to become more rigid, while under reduced shear rates the dilatant foam may be softer or more flexible, and pseudoplastic foams may exhibit an inverse response as described above.

Non-Newtonian solids are another category of non-Newtonian materials. Non-Newtonian solids may be produced by solidifying non-Newtonian gels or fluids, or by introducing non-Newtonian material into solid objects. Processes such as extrusion or injection molding may be used to produce non-Newtonian solids. Non-Newtonian solids may exhibit similar behavior to other non-Newtonian materials; for instance a dilatant solid may be relatively flexible or elastic under lower shear rates, but may be more rigid or hard when subjected to high shear rates, such as those resultant from a sudden impact. Similar mechanisms to those causing shear thickening in other non-Newtonian materials may produce shear-thickening behavior in non-Newtonian solids.

An additional kind of non-Newtonian material includes non-Newtonian filaments. A non-Newtonian filament may be formed by any suitable processes, or combination of processes, including, for example, injection molding, extrusion, or spinning out of a melt. The non-Newtonian filament may exhibit the characteristics of a non-Newtonian solid.

An additional kind of non-Newtonian material includes impregnated fibers. An impregnated fiber may include, for example, a fiber or yarn that has absorbed, and/or is coated with, a non-Newtonian material. The fiber may include a high strength polymeric fiber. The non-Newtonian material may be a fluid, and may retain its fluid characteristics after impregnation. This may help to ensure that the impregnated fiber will remain flexible, while endowing the fiber with non-Newtonian properties. Non-Newtonian-impregnated fibers and non-Newtonian filaments may be used in combination with or in lieu of any other fiber in any textile, endowing the textile with the non-Newtonian properties of the fibers and/or filaments, in combination with any additional properties of the textile.

An additional kind of non-Newtonian material includes impregnated fiber reinforced materials. An impregnated fiber reinforced material may include, for example, a fabric that has absorbed, and/or is coated with, a non-Newtonian material. Additionally or alternatively, the impregnated fiber reinforced material may include previously impregnated fibers woven together to form a fabric. It is also contemplated that the impregnated fiber reinforced material may include a fabric made by weaving together non-Newtonian filaments and/or impregnated fibers. It is further contemplated that the fabric or fibers may be set into another medium to reinforce that medium. It is also contemplated that non-Newtonian materials may be mixed in with the medium to impart non-Newtonian properties to the medium.

The impregnated fiber reinforced material may exhibit non-Newtonian behaviors, similar those described above with respect to the other categories of non-Newtonian materials. For example, the coefficient of friction between the fibers, and/or between the fibers and the medium, may increase during an impact event, causing the fibers and/or medium to become more rigid, resulting in dilatant behavior. It is further contemplated that the fibers may form a substrate that, when a dilatant material permeates the fibers, holds particles of the dilatant material in place. When an object suddenly strikes the impregnated fiber reinforced material, the dilatant material will immediately thicken or harden, imparting its hardness to the overall construction. The flexibility of the overall construction will return upon removal of the force. Similarly, fibers of a fiber-reinforced material incorporating pseudoplastic material may act as a substrate retaining the pseudoplastic material at high shear rates, where the flexibility or elasticity of the fiber-reinforce material will increase in response to the high shear rates.

Non-Newtonian textile represents another category of non-Newtonian material. A non-Newtonian textile may be formed using any non-Newtonian fibers, non-Newtonian fiber-reinforced materials, or fibers impregnated with non-Newtonian material. Fibers or fiber-reinforced material may formed into non-Newtonian textile by any suitable process for combining fibers or fiber-reinforced materials into textiles, including without limitation weaving fibers or fiber-reinforced materials and matting fibers or fiber-reinforced materials.

An additional kind of non-Newtonian material includes non-Newtonian composites. A non-Newtonian composite may include, for example, a solid foamed synthetic polymer. The solid foamed synthetic polymer may include an elastic, and/or an elastomeric matrix. The elastomeric matrix may retain its own boundaries without need of a container. The composite may also include a polymer-based non-Newtonian different from the solid foamed synthetic polymer. The polymer-based non-Newtonian may be distributed through the matrix and incorporated therein during manufacture. The composite may also include a fluid distributed through the matrix. The combination of the matrix, non-Newtonian, and fluid may be selected such that the composite may be resiliently compressible (i.e., display resistance to compressive set), and preferably also flexible.

Another non-Newtonian composite may include a solid, closed cell foam matrix and a polymer-based non-Newtonian, different from the matrix, distributed through the matrix. The composite may also include a fluid distributed through the matrix. The combination of matrix, non-Newtonian, and fluid may be selected such that the composite may be resiliently compressible.

In either of the non-Newtonian composites described above, any suitable solid materials may be used as the matrix, including, for example, elastomers. This may include natural elastomers, as well as synthetic elastomers, including synthetic thermoplastic elastomers. These may include elastomeric polyurethanes, silicone rubbers, and ethylene-propylene rubbers. Any polymer-based non-Newtonian that may be incorporated into the matrix may be used in the non-Newtonian composites. The for instance, a dilatant polymer may be selected from silicone polymer-based materials, such as borated silicone polymers. The non-Newtonian may be combined with other components in addition to the components providing the non-Newtonian behavior, including, for example, fillers, plasticisers, colorants, lubricants and thinners. The fillers may be particulates (including microspheres), fibrous, or a mixture of the two. It is contemplated that a borated siloxane-based material may be used as a dilatant.

An additional kind of non-Newtonian material includes non-Newtonian layers. A non-Newtonian layer may include a layer of material formed from one of, or a combination of, the above-categories of non-Newtonian materials. The non-Newtonian layer may be combined with layers having other properties, such that the combined layers may exhibit some form of non-Newtonian behavior as a result.

The use of the terms "non-Newtonian materials," "pseudoplastic materials," and/or "dilatant materials" in the following description of motile buoyancy apparatuses is meant to cover all categories of non-Newtonian, pseudoplastic, and/or dilatant materials known to those skilled in the art, including without limitation the categories and examples of non-Newtonian, pseudoplastic, and/or dilatant materials described herein.

Exemplary embodiments are discussed herein of buoyancy apparatuses. A buoyancy apparatus as used herein is a device that regulates vertical position of an object within a fluid medium by means other than support on a rigid structure attached to a geologic feature, or similar fixed feature such as a floor or container containing the fluid. Object may include without limitation one or more persons, one or more elements of cargo, one or more elements of machinery, one or more structural elements. Fluid may include without limitation water, which may be fresh, salt, brackish, or hypersaline, as well as any other fluid. Vertical position, as used herein, is the position of a buoyancy apparatus along the direction of acceleration of a non-inertial reference frame; for instance, where there is gravity, vertical position may be position relative to the "down" direction in which gravity is pulling massive objects in the vicinity of the buoyancy apparatus.

Regulation of vertical position may be accomplished by flotation, or passive buoyancy; that is, where the downward force of gravitation (generally, in a non-inertial reference frame, acceleration of the reference frame) on the buoyancy apparatus is neutralized or exceeded by the weight (or force under reference frame acceleration) of the fluid displaced by the buoyancy apparatus. Passive buoyancy may be caused by the degree of difference in overall density of the buoyancy apparatus relative to the fluid. As an example, a buoyancy apparatus may be less dense than the surrounding fluid, causing the device to float on the surface of the fluid. A buoyancy apparatus may be sufficiently dense to sink below the surface of the fluid, but have a density equal to the density of the fluid farther below the surface; as a non-limiting example, a submarine or other submersible vehicle may have density that causes the submarine or other submersible vehicle to sink to a certain depth in an ocean where water pressure renders the water at that depth equal to the density of the submarine or other submersible vehicle, causing the submarine or other submersible vehicle to remain at that depth. The depth at which the density of a buoyancy apparatus matches the density of surrounding fluid may be referred to as the equilibrium position, where passive buoyancy causes the buoyancy apparatus to remain at that depth, rather than to rise or sink. Passive buoyancy may be accomplished by the density of a particular material making up a large proportion of a buoyancy apparatus, such as lighter-than-water foams, wood, or similar items used to effect the buoyancy of a buoy or life jacket, or by a combination of materials of differing density to achieve an overall effective density, such as in a metal-hulled boat.

Passive buoyancy may be altered by modifying the density of a buoyancy apparatus. As a non-limiting example, a submarine or submersible vehicle may expel air and accept water into ballast tanks to increase density, causing the submarine or submersible vehicle to sink to an equilibrium position at a lower depth; similarly, water may be expelled and air introduced, for instance from compressed air tanks, causing the overall density of the submarine or submersible vehicle to decrease, and causing the submarine or submersible vehicle to rise to a higher equilibrium position or to the surface. As another example, a buoyancy apparatus may contain a material that enters a liquid phase at a higher-temperature portion of the fluid and a solid phase at a lower-temperature portion of the fluid, and may have differing densities at the liquid and solid phases; for instance, the material may have a lower density in the solid phase, and may enter the solid phase at temperatures encountered near the ocean floor, causing the buoyancy apparatus to rise, while entering the liquid phase at the surface, causing the buoyancy apparatus to sink.

Buoyancy apparatus may regulate vertical position by active buoyancy, or buoyancy achieved by motion of matter relative to the fluid. Active buoyancy may include dynamic lift, wherein movement of the buoyancy apparatus through the fluid causes the fluid to exert an upward or downward force, causing the buoyancy device to move vertically through the fluid, or to remain at a particular depth in counteraction to the effects of passive buoyancy. Dynamic lift may be caused by passage of fluid against or past surfaces that the fluid pushes against, and by the turbulence and pressure effects of lift as caused by foils or hydrofoils. Surfaces causing dynamic lift may include without limitation fins, wings, angled or curved planes of a surface of a buoyancy apparatus, foils such as hydrofoils, and the like. Active buoyancy may also include expulsion of mass in a direction opposite to the direction of motion of a buoyancy apparatus, such as without limitation expulsion of fluid, liquid, gas, or solid material using jets, rockets or the like, and movement of fluid a propeller or turbine.

Examples of buoyancy devices as used herein include without limitation buoys, personal flotation devices such as life-preservers, life jackets, floating oil rigs, floating docks, watercraft such as boats, rafts, canoes, water recreation sporting equipment as described in further detail below, submarines, submersibles, and autonomous underwater vehicles.

A buoyancy device may be a motile buoyancy device. A motile buoyancy device is a buoyancy device that is designed to move through a fluid, rather than to float passively in the fluid, whether free-floating or tethered. A motile buoyancy device is propelled through the fluid by a force other than passive buoyancy as defined above. The force may be exerted by a human being, for example by paddling or rowing. The force may be exerted by an engine or motor, such as without limitation an engine or motor driving a propeller, wind turbine, water turbine, jet. The force may be exerted by towing a motile buoyancy device; as a non-limiting example, the motile buoyancy device may be a waterski or wakeboard towed behind a boat. The force may be exerted by manipulation of natural forces acting on a motile buoyancy device; examples include sailing, where propulsive force is generated by causing the wind to push against a surface such as a sail or wing, and surfing, where the force of waves on the surface of the water is converted into forward motion of a surfboard by manipulation of the direction and angle of the surfboard on the surface of the waves. A motile buoyancy device may have a hydrodynamic form, which as used herein is a form that reduces or minimizes fluid resistance to motion through the fluid; a hydrodynamic form may include without limitation a form that is streamlined, presenting surfaces permitting smooth laminar flow about the form, a form with a pointed or wedge-shaped end preceding the form as it moves through the fluid and causing the fluid to part about the form, a form shaped to reduce turbulence that is not needed for dynamic lift, and a surface having qualities reducing friction and viscous resistance to motion through the fluid.

Referring now to FIG. 1A, an exemplary motile buoyancy apparatus 100 for use in a fluid is illustrated. Motile buoyancy apparatus may be any motile buoyancy apparatus as described above. Motile buoyancy apparatus 100 may be actively or passively buoyant. Motile buoyancy apparatus 100 includes an outer layer 104. Outer layer 104 includes a performance surface 108. Motile buoyancy apparatus includes at least a portion 112 including a first material 116. First material 116 is a non-Newtonian material. It is to be noted in the description that follows that in the interest of clarity not every element of the illustrated examples is labeled, particularly where many substantially identical examples of elements are present.

Still referring to FIG. 1A, motile buoyancy apparatus 100 is used in a fluid. A fluid may include without limitation any quantity of standing or flowing water through which motile buoyancy apparatus 100 can move, including without limitation a stream, a pond, a lake, a river, an ocean, a sea, a swimming pool or other recreational pool, a reservoir, a lagoon, or a pool. A fluid may include portions of any fluid, such as without limitation bays, estuaries, fjords, inlets, and the like. Exemplary embodiments will be discussed below with regard to bodies of fluid in which the fluid is water; persons skilled in the art, upon reading the entirety of this disclosure, will be aware of various ways in which the examples so presented may function equivalently in other bodies of fluid.

Continuing to refer to FIG. 1A, outer layer 104 of motile buoyancy apparatus 100 includes performance surface 108. Performance surface is defined herein as the surface that contacts the water during operation of motile buoyancy device 100. Performance surface 108 may not encompass the entire outer layer 104 of motile buoyancy device 100; for instance, where the motile buoyancy device 100 floats on the surface of the fluid, performance surface 108 may include the portion of outer layer 104 that is submerged beneath the water. Performance surface 108 may include portions of outer layer 104 that contact or are submerged in the water only for specific operations of motile buoyancy device 100; for instance, part of a rail of a surfboard, as described in further detail below, may be submerged when the surfboard is being used in a particular maneuver on a wave, but may not be submerged when the opposite rail is submerged, or while paddling between waves. Non-limiting examples of performance surface 108 include bottoms and rails of surfboards, bottoms and edges of water skis, exterior surfaces of submerged portions of hulls, exterior surfaces of hydrofoils, exterior surfaces or projections and/or fins as described below, exterior surfaces of rudders, and other examples that will become apparent to a person skilled in the art upon reading the entirety of this disclosure.

Still referring to FIG. 1A, motile buoyancy apparatus 100 may be made up of any materials suitable for an exterior surface of a motile buoyancy device as described above. Without limitation, materials making up motile buoyancy apparatus 100 may include wood, which may be solid wood, plywood, particle board, or similar materials. Wood may be treated with tars coatings or varnishes for waterproofing and other surface characteristics. Materials making up motile buoyancy apparatus 100 may include natural or artificial polymers or mixtures of polymers, such as rubbers, plastics, silicones, and other polymer materials. Materials making up motile buoyancy apparatus 100 may include expanded polystyrene. Materials making up motile buoyancy apparatus 100 may include fiberglass. Materials making up motile buoyancy apparatus 100 may include polyurethane foam, including without limitation polyurethane foam with epoxy resin. Materials making up motile buoyancy apparatus 100 may include EPS epoxy foam. Materials making up motile buoyancy apparatus 100 may include varial foam. Materials making up p motile buoyancy apparatus 100 may include carbon fiber, such as a carbon fiber wrap. Materials making up motile buoyancy apparatus 100 may include fibers, including textiles, such as aramid. Materials making up motile buoyancy apparatus 100 may include metal, including without limitation steel and aluminum. Materials may be combined in any suitable manner, including lamination, which may be accomplished by combining layers using epoxy or other suitable adhesives. For instance, various rigid, flexible, and buoyant materials may be combined together by lamination or other methods to produce an overall body having a desired effect.

Continuing to refer to FIG. 1A, outer layer 104 and performance surface 108 may be formed from the outer surface of materials making up motile buoyancy apparatus, or may be formed by coating part or all of the outer surface of such materials. For instance, and without limitation, outer surface 104 may include a coating of fiberglass cloth, a wrapping of carbon fiber, paint, varnish, polymer coatings, textile coatings, or any other suitable exterior treatment. Performance surface 108 may include further elements, such as elements to waterproof performance surface 108, elements to reduce friction or viscous resistance to fluid flow past performance surface 108. Where motile buoyancy apparatus 100 is inflatable as described in further detail below, outer surface 104 may include flexible and airtight material such as textiles, polymers, or combinations thereof; performance surface 108 may be further coated with low-friction polymer material, or polymer material to increase water-tightness. Any and all materials used to make up motile buoyancy apparatus 100, outer layer 104, and/or performance surface 108 may be combined with non-Newtonian materials as described above and as further described below.

In an embodiment, and still referring to FIG. 1A, outer layer 104, performance layer 108, or both may display elastic properties. For instance, performance surface 108 may display area elastic properties. In some embodiments, a surface may display area elastic properties where a region of the surface surrounding an impact is displaced by elastic deformation in response to the impact. A wood surface or similarly stiff surface may exhibit area elastic properties. Performance surface 108 may be point elastic, where only the point of impact is displaced by the impact, leaving the surrounding area relatively stable. As a non-limiting example, performance surface 108 may include a polymer, textile, or rubber surface that exhibits point-elastic behavior. As described in further detail below, apparent material properties of performance surface 108 may be affected by at least a portion 112 including first material 116.

Still referring to FIG. 1A, performance surface 108 may have any suitable shape for a performance surface of a motile buoyancy apparatus as described above. Performance surface 108 may have a hydrodynamic shape as described above. For example, and without limitation, performance surface 108 may have a shape of a boat or ship hull such as the hull of a motor boat, fishing vessel, canoe, kayak, sailboat, catamaran, military vessel, or container ship. Performance surface 108 may be or may be shaped similarly to a bottom or combined bottom and rails of a surfboard, a bottom of a wakeboard, bodyboard, skim board, knee board, paddle board, water ski, windsurfing board, or the like. Performance surface 108 may include the surface of one or more projections such as a fin, rudder, keel, running board, or hydrofoil. Performance surface 108 may incorporate one or more additional features to aid in steering, ease of passage through water, or other traits desirable in a motile buoyancy apparatus as described herein, such as a chine, a prow, a rocker, a ridge, or other forms. Persons skilled in the art will be aware of many forms that performance surface 108 may take consistently with descriptions and examples presented in this disclosure.

Continuing to refer to FIG. 1A, motile buoyancy apparatus 100 includes at least a portion 112 including a first material 116. The first material 116 is a non-Newtonian material. In an embodiment, first material 116 may be a material having an increased shear resistance when exposed to an increased shear rate. First material 116 may be dilatant material. First material 116 may be a shear-thickening material. First material 116 may be a material having decrease shear resistance when exposed to an increased shear rate. First material 116 may be a pseudoplastic material. First material may be a shear-thinning material. First material 116 is not a non-Newtonian powder. First material 116 may be a material that exhibits non-Newtonian properties when exposed to typical shear stresses imposed by navigation through water; typical shear stresses may include shear stresses imposed by waves, currents, or flow of water against or past performance surface 108. First material 116 may be a material that exhibits non-Newtonian properties in its installed form; for instance, first material 116 may not require breakage or exposure to excessive force before exhibiting non-Newtonian characteristics.

Still referring to FIG. 1A, first material may include any kind of non-Newtonian material as described above, including non-Newtonian solids, fluids, gels, foams, capsules, and the like. First material may be included in a non-fluid package, which may be any unit of material that does not allow the escape or evaporation of fluid or fluid-like elements of non-Newtonian material; non-fluid package may exhibit behavior of a solid when interacting with elements outside non-fluid package. As a non-limiting example, non-fluid package may include a unit of encapsulated non-Newtonian liquid or gel, as described above. Non-fluid package may include solidified non-Newtonian foam. Non-fluid package may include a non-Newtonian solid. Non-fluid package may include a unit of material composed wholly or in part of non-Newtonian fibers, non-Newtonian-material impregnated fibers, non-Newtonian material-impregnated fiber reinforced material, a non-Newtonian composite material, or a non-Newtonian layer material, as described above. In the ensuing discussion, one or more portions, which may be sections, layers, or other portions, of at least a portion 112 may have differing physical properties from one or more other portions of at least a portion 112. For instance, at least a portion 112 may include one or more portions having a first density and one or more portions having a second density. First density may be greater than second density; second density may be greater than first density. At least a portion 112 may include one or more portions having a first elasticity and one or more portions having a second elasticity. First density may be greater than second elasticity; second density may be greater than first elasticity. For instance, at least a portion 112 may include one or more portions having a first resting position on a continuum from softness to rigidity as disclosed above, and one or more portions having a second resting position on the continuum. First resting position may be at a greater rigidity than second resting position; second resting position may be at a greater rigidity than first resting position. In general, for any category of variation possible in the construction, material composition, or physical properties of non-Newtonian materials as described herein, at least a first portion may embody a first variation while at least a second portion may embody a second variation.

Continuing to refer to FIG. 1A, at least a portion 112 may include at least a capsule containing first material 116; at least a capsule may be a plurality of capsules. At least a capsule may have flexible walls. At least a capsule may be formed to any shape or a part of any shape described below for exemplary forms of at least a portion 112; at least a capsule may be assembled in a desired form by creating capsule walls of desired dimensions and filling with non-Newtonian material, by cutting a previously formed capsule into a desired size or shape, or by combining previously formed capsules into a desired size or shape. Cutting capsule may further include sealing walls of capsule together at locus of cut, for instance by heat-sealing.

With continued reference to FIG. 1A, at least a portion 112 may include at least a pad of first material 116; for instance, at least a pad may be composed of non-Newtonian foam, solid, textile material, or composite material. At least a pad may include a plurality of pads. At least a pad may be formed to any shape or a part of any shape described below for exemplary forms of at least a portion 112; forming may be accomplished by assembling, matting, or weaving pad to desired size or shape, or by forming to a standard shape and either cutting or assembling standard-shaped pad or pads to desired size or shape of padding.

Still referring to FIG. 1A, first material 116 may display dilatant properties. For instance, first material 116 may be apparently flexible or soft when subjected to low shear rates, such as slow-acting forces. First material 116 may become harder or more rigid when subjected to higher stress rates. Thus, first material 116 may be relatively pliable during typical navigation or motion through water, but may become substantially stiffer during more powerful seas or when exposed to stronger currents. First material 116 may display pseudoplastic properties. For instance, first material may be apparently hard or rigid when subjected to low shear rates, such as slow-acting forces. First material 116 may become softer or more pliable when subjected to higher stress rates. Thus, first material 116 may be relatively pliable when exposed to strong impacts or currents, and stiffer under more typical navigational circumstances.

With continuing reference to FIG. 1A, least portion 112 including the first material 116 may include at least a portion of performance surface 108. First material may be incorporated in performance surface 108 in any suitable manner. In an embodiment, all of at least a performance surface 108 is made up of first material; for instance, all or substantially all of performance surface 108 may be a pad, or set of pads or capsules assembled into padding, of first material. Performance surface 108 may include a layer or sublayer that is substantially all made up first material. In an embodiment, first material is combined with additional material in performance surface 108; for instance, performance surface 108 may combine first material with elastic material, resulting in performance surface 108 that exhibits damped elastic behavior wherein the elastic materials produce elastic recoil when deformed and the first material resists motion to a degree proportional to a positive power of the velocity of deformation and/or recoil, where first material 116 is dilatant. As a further non-limiting example, performance surface 108 may contain intermixed non-Newtonian and other materials; for instance non-Newtonian material may be intermixed with elastic material in solid or foamed form. Non-Newtonian material may be woven into non-dilatant material; for instance, filaments or fibers of dilatant material, or filaments, fibers, or textile impregnated with dilatant material, may be woven into non-dilatant material. Non-Newtonian material may be layered with non-dilatant material in vertical, horizontal, radial, or other arrangements of layers.

Figure 1B:
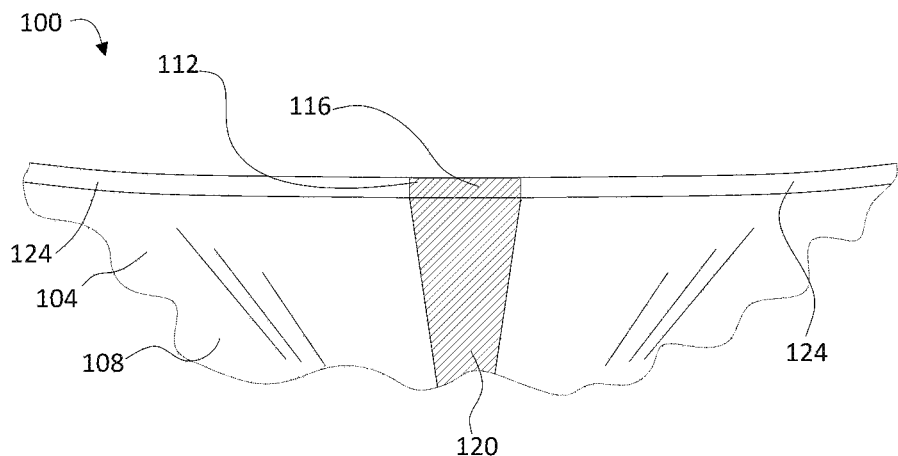
FIG. 1B is a perspective drawing illustrating a portion of an exemplary motile buoyancy device in an embodiment.

In an embodiment, and referring now to FIG. 1B, the performance surface may include at least a first portion 120 including the first material 116, and at least a second portion 124 including at least a second material. At least a first portion 120 may include may have any desired form. For instance, each of the at least a first portion 120 may have a substantially rectilinear or board-like form. Each of plurality of sections may have any three-dimensional or two-dimensional form encompassing regular or irregular polygonal, polyhedral, curved or combined forms. Each of at least a first portion 120 may run substantially all the length or breadth of motile buoyancy apparatus 100; for instance, at least a first portion 120 may form a stripe-like pattern across performance surface 108.

In an embodiment, and continuing to refer to FIG. 1B, each of at least a first portion 120 may run less than a full length or breadth of performance surface 108; as a non-limiting example, at least a first portion 120 and at least a second portion 124 may form a tessellated pattern, such as a checkerboard-like pattern of rectilinear forms, a pattern of adjacent polygonal forms, curved forms, combinations thereof, or other spaces. Tessellated at least a first portion 120 and plurality of sections of second material may include patterns of identical forms or varied forms; for example, different sections may have different shapes or sizes that combine to form performance surface 108. In an embodiment, first material is used in specific locations of performance surface 108, as illustrated in further examples below. Sections may be arranged in a staggered brick pattern with ends offset by a prescribed amount to ensure overlap.

Still referring to FIG. 1B, each section of at least a second portion 124 may have any size or shape suitable for a section of the at least a first portion 120. Dimensions and shapes of at least a second portion 124 may complement dimensions and shapes of plurality of sections of at least a first material. At least a second material may include a substantially rigid material. Substantially rigid material may be any rigid material suitable for the construction of performance surface 108. At least a second material may include flexible material. Flexible material may include any flexible material suitable for use in motile buoyancy apparatus 100 as described above. Flexible material may include, without limitation, flexible polymers in block, sheet, or layered forms. Flexible material may include textile or fiber mat material. Flexible material may include flexible foam. At least a second material may include elastic materials. Elastic materials may include any elastic materials suitable for use in construction of motile buoyancy apparatuses as described herein. Elastic material may include elastic polymers such as natural or artificial rubber material, silicone, and the like. Elastic material may include springs, such as metal leaf or coiled springs. Elastic material may use gas as an elastic material; for instance, elastic material may include closed cells, such as closed neoprene cells. At least a second material may include one or more non-Newtonian materials as described above.

At least a second material may include any combination of the above-described materials. At least a second material may include a first portion of substantially rigid material and a second portion of a different material. The different material may be substantially elastic material. The different material may be substantially flexible material. Although combinations are shown in FIG. 1B as being arranged side-by-side, in some embodiments at least a first portion 120 and at least a second portion 124 may be arranged vertically; for example, at least a first portion 120 may be on top of at least a second portion 124 or vice versa. A strip of one material may be laid on top of or embedded in a portion of another material. A plurality of first portions and/or second portions may be present in each section of at least a second material; for example, a section of at least a second material may include one or several rigid portions combined with any combination of flexible material, and elastic material.

Still referring to FIG. 1B, at least a second material may include intermixed materials of two or more types. For instance, elastic and non-elastic flexible materials may be mixed together in a portion of at least a second material; as a non-limiting example, elastic fibers may be inserted or woven through an inelastic flexible material. Rigid and flexible or elastic pieces may be mixed together. Any material may be impregnated, woven, or intermixed with non-Newtonian material according to any method described above. Some sections of at least a first portion 120 and at least a second portion 124 may overlap. For instance, in some embodiments, a portion of at least a section of plurality of sections of at least a second material overlaps with at least one section of plurality of sections of first material. Overlapping portions of the at least a section of plurality of sections of second material and at least a section of the at least a first portion 120 may have any form, including flanges, combinations of grooves and projecting ridges, combinations of recesses and protrusions, teeth, and the like. Overlapping portions may run the length of sections or may run only for a portion of sections.

Figure 2:
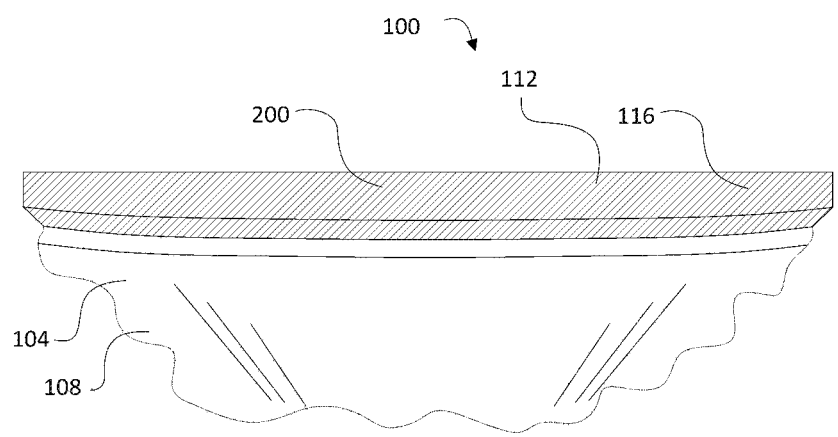
FIG. 2 is a perspective drawing illustrating a portion of an exemplary motile buoyancy device in an embodiment.
Figure 3:
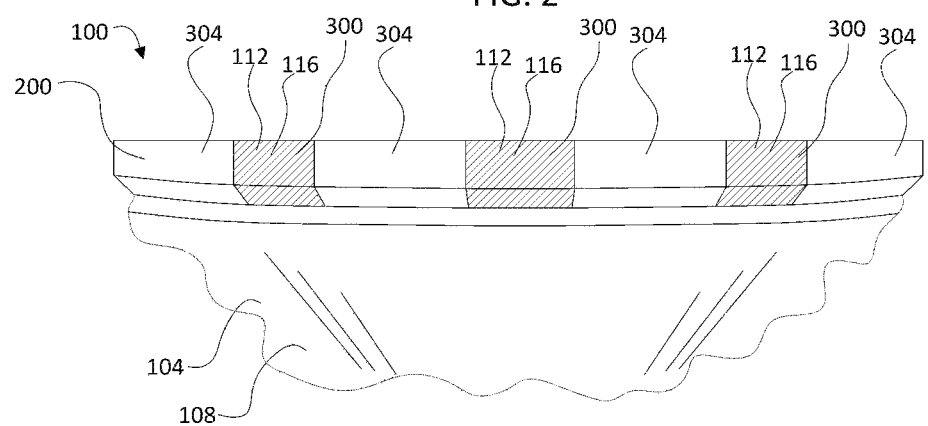
FIG. 3 is a perspective drawing illustrating a portion of an exemplary motile buoyancy device in an embodiment.

Referring now to the exemplary embodiment illustrated in FIG. 2, motile buoyancy apparatus 100 may include at least an inner layer 200. At least an inner layer 200 may be composed of any materials or combinations of materials suitable for the composition of motile buoyancy apparatus 100, outer layer 104, and/or performance surface 108 as described above. The at least a portion 112 including the first material 116 may include at least a portion of the at least an inner layer. At least a portion of inner layer 200 may incorporate first material 116 in any manner described above for incorporation of first material 116 in performance layer 108 as described above. For instance, at least a portion 112 of first material 116 may make up all, or substantially all, of at least an inner layer 200. As shown in FIG. 3, at least a second layer 200 may include at least a section 300 including first material 116 and at least a section 304 including at least a second material. At least a section 300 including a first material 116 may be formed according to any manner described above for at least a section 120 including a first material in performance surface 108. At least a section 304 including at least a second material may contain any material or combination of material in any form as described above for at least a section including at least a second material 124 in performance surface 108. For example, and without limitation, at least a second material may include a rigid material. As a further example, at least a second material may include an elastic material.

Figure 4A:
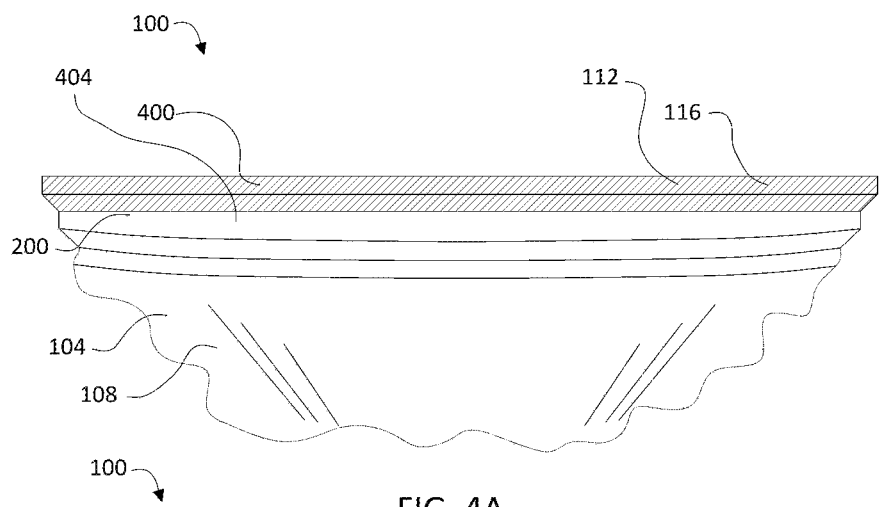
FIG. 4A is a perspective drawing illustrating a portion of an exemplary motile buoyancy device in an embodiment.
Figure 4B:
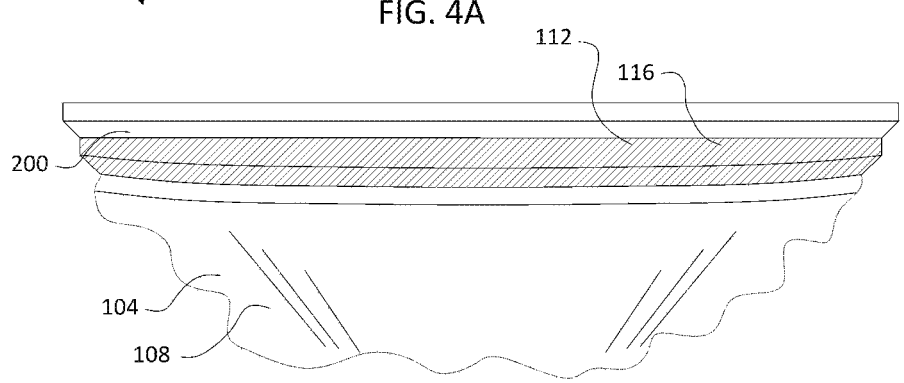
FIG. 4B is a perspective drawing illustrating a portion of an exemplary motile buoyancy device in an embodiment.
Figure 4C:
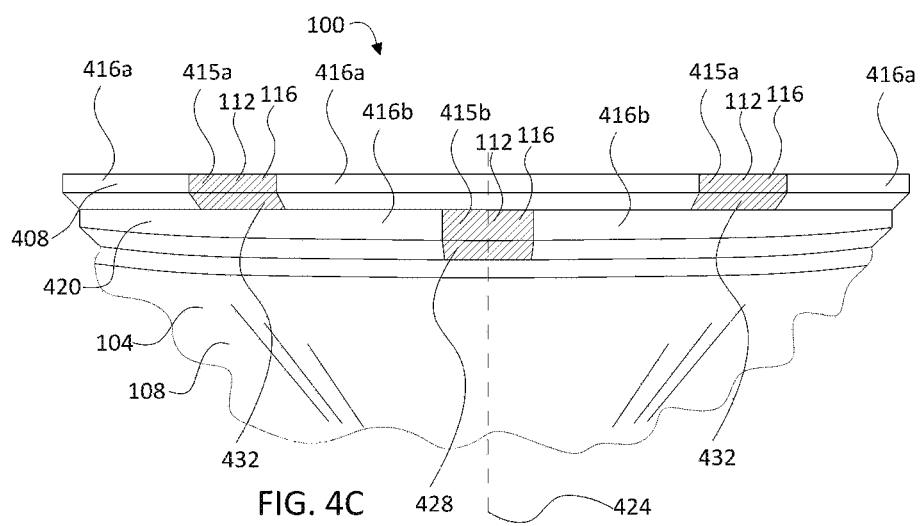
FIG. 4C is a perspective drawing illustrating a portion of an exemplary motile buoyancy device in an embodiment.

Referring now to FIGS. 4A-C, inner layer 200 may include a plurality of sublayers. For instance, and without limitation, inner layer 200 may include at least a first sublayer 400 including the first material and at least second sublayer 404 including at least a second material. At least a second sublayer 404 may be adjacent to outer layer 104, for instance as shown in FIG. 4A. At least a first sublayer 400 may be adjacent to outer layer 104, for instance as shown in FIG. 4B. Plurality of sublayers may include one or more sublayers with one or more sections including first material 116 and one or more sections containing at least a second material, as illustrated for instance in FIG. 4C; sections including first material 116 and sections including at least a section material may be implemented as described above in reference to FIGS. 1B and 3. Plurality of sublayers 116 may include alternating layers of first material and at least a second material; for example, a sublayer made up substantially entirely of at least a second material may be sandwiched between two sublayers made up substantially entirely of first material 116.

In an embodiment, with continued reference to FIG. 4C, an inner sublayer 408 includes a plurality of sections 412a including the first material 116 and a plurality of sections 416a of at least a second material. Plurality of sections including first material 412a may have any form or composition described above. Plurality of sections of second material 416a may have any form or composition as described above. An outer sublayer 420 may also include a plurality of sections 412b of first material 116 and a plurality of sections 416b of at least a second material. Sections of first material in the inner sublayer may be directly over sections of first material in the outer sublayer, or may be over sections of at least a second material in the outer sublayer.

Still referring to FIGS. 4A-C, and as further illustrated in exemplary embodiments below, motile buoyancy apparatus 100 may be bilaterally symmetrical about an axis of symmetry 424. Axis of symmetry 424 may be a fore-aft axis of the motile buoyancy apparatus 100; for instance, the axis of symmetry 424 may be the axis along which the keel runs in a boat, or the longitudinal axis of symmetry of a surfboard or similar motile buoyancy apparatus 100 as described below. Performance surface 108 may be bilaterally symmetrical about an axis of symmetry, which may be axis of symmetry 424. At least a portion 112 including the first material 116 may be bilaterally symmetrical about the axis of symmetry 424. At least a portion 112 including the first material 116 may include a portion 428 running along axis of symmetry 424; the portion 428 may be symmetrically disposed about the axis of symmetry 424. Portion 428 may have any material or shape characteristics described above for any portion or section of at least a portion 112 including first material 116. At least a portion 112 may include a plurality of portions 432 arranged symmetrically on either side of axis of symmetry 424; the plurality of portions 432 may have any material or shape characteristics described above for any portion or section of at least a portion 112 including first material 116. At least a portion 112 may be bilaterally symmetrical about axis of symmetry 424 where motile buoyancy apparatus 100 is not bilaterally symmetrical about axis of symmetry 424. At least a portion 112 may be bilaterally symmetrical about axis of symmetry 424 where performance surface 108 is not bilaterally symmetrical about axis of symmetry 424. At least a portion 112 may not be bilaterally symmetrical about axis of symmetry 424 where motile buoyancy apparatus 100 is bilaterally symmetrical about axis of symmetry 424. At least a portion 112 may not be bilaterally symmetrical about axis of symmetry 424 where performance surface 108 is bilaterally symmetrical about axis of symmetry 424.

Figure 5A:
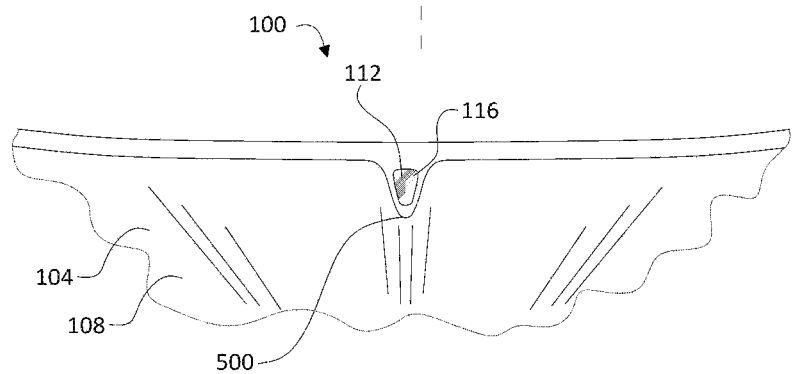
FIG. 5A is a perspective drawing illustrating a portion of an exemplary motile buoyancy device in an embodiment.
Figure 5B:
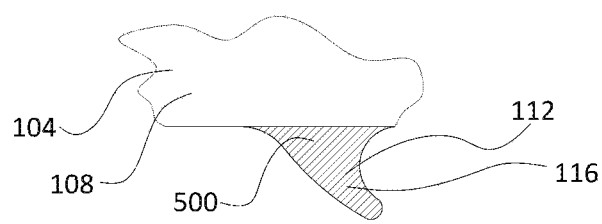
FIG. 5B is a schematic drawing illustrating at least an extension in an embodiment.
Figure 5C:
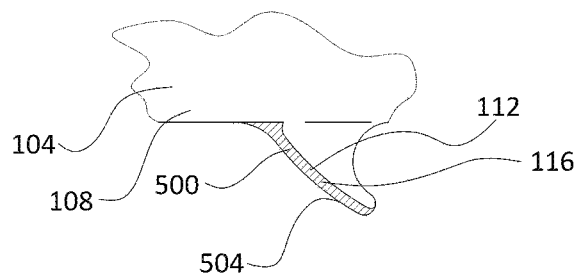
FIG. 5C is a schematic drawing illustrating at least an extension in an embodiment.

Referring now to FIGS. 5A-D, motile buoyancy apparatus may include at least a projection 500 into the fluid. At least a projection 500 may be a keel or keel-like projection running along performance surface, as shown for example in FIG. 5A; where motile buoyancy apparatus 100 or performance surface 108 has an axis of symmetry, keel or keel-like projection may run along the axis of symmetry. At least a projection 500 may include one or more ridges; in some embodiments one or more ridges run from fore to aft along performance surface. At least a projection 500 may include one or more fins, as shown in FIGS. 5B-C. A fin may be a structure having a two flat side surfaces bounded by a leading edge and a trailing edge; leading edge may be oriented toward a front end of motile buoyancy apparatus 100. Two flat side surfaces may be parallel to a central axis of symmetry running from fore to aft. At least a projection 500 may be weighted, for instance to provide ballast or added stability to motile buoyancy apparatus 100.

At least a portion 112 may include at least a portion 504 of at least a projection 500. At least a portion 504 may be injected into at least a projection 500 as shown for example in FIG. 5A. At least a portion 504 may be all of at least a projection 500 as shown for example in FIG. 5B. At least a portion 504 may make up a section of at least a projection 500 as shown for example in FIG. 5C. Performance surface may include an edge, which may include, as a non-limiting example, a rail of a surfboard as shown below. At least a portion including the first material may include at least a portion of the edge.

Figure 5D:
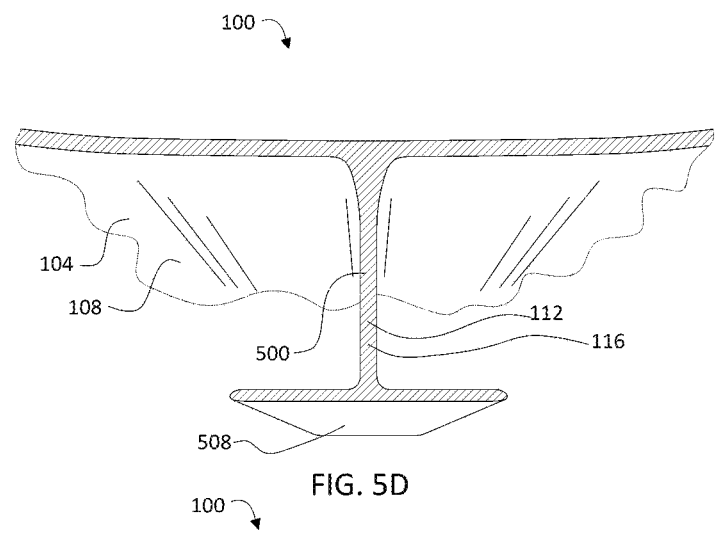
FIG. 5D is a schematic drawing illustrating a hydrofoil in an embodiment.

At least a projection 500 may include a hydrofoil 508 as shown in FIG. 5D. In an embodiment, a hydrofoil is an element having at least a surface that produces dynamic lift when moving through the water, lifting motile buoyancy apparatus 100 partially out of the water; hydrofoil 508 may lift motile buoyancy apparatus 100 fully out of the water, with exception of hydrofoil 508. Performance surface 108 may include at least a surface of hydrofoil 508. At least a portion 112 including first material 116 may include at least a portion of hydrofoil 508; the at least a portion 112 and/or at first material 116 may be incorporated in hydrofoil in any manner suitable for incorporation of at least a portion 112 and/or first material 116 in any of motile buoyancy apparatus, outer layer performance layer, or inner layers and/or sublayers as described above. Hydrofoil 508 may be incorporated in various forms of motile buoyancy apparatus 100, from foil surfboards used in foil surfing to hydrofoil boats and/or ships.

Still referring to FIGS. 5A-D, first material may be included in a structure strength element of motile buoyancy device 100. Structural strength element may include any structural element of motile buoyancy device 100 designed to augment the structural strength of motile buoyancy device 100. Non-limiting examples of structural strength elements may include a keel as illustrated for example in reference to FIG. 5A, a stringer as illustrated for example below in reference to FIGS. 8A-B, a rib as illustrated below in reference to FIG. 19E, a strut, an element holding together surfaces in an inflatable motile buoyancy apparatus 100 as illustrated below in reference to FIG. 6, as well as sealed bulkheads, chines, or other structural elements.

Figure 6:
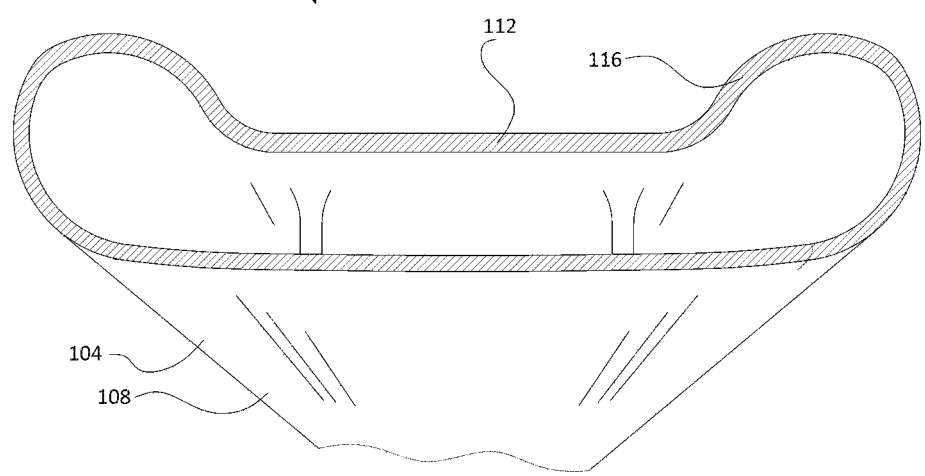
FIG. 6 is a schematic drawing illustrating a portion of an inflatable motile buoyancy apparatus in an embodiment.

Referring now to FIG. 6, motile buoyancy apparatus 100 may be inflatable. In an embodiment, motile buoyancy apparatus 100 is inflatable where the motile buoyancy apparatus 100 includes least a chamber 604 having a flexible exterior membrane 608, the at least a chamber containing a pressurized gas. Flexible exterior membrane 608 may be composed of any material or combination of materials capable of keeping pressurized gas inside of at least a chamber 604, including fiber or textile materials, polymer materials, fiber-reinforced materials, or combinations thereof; external membrane 608 may include a plurality of layers of flexible material. Performance surface 108 may be a portion of exterior membrane as shown for example in FIG. 6; one or more chambers may be surrounded by outer layer 104, and the performance surface 108 may not be a portion of exterior membrane. At least a portion 112 including first material 116 may include a portion of exterior membrane; for instance, and without limitation, exterior membrane may include at least a layer of fiber-reinforced material including first material, 116. Exterior membrane may include filaments of first material 116. Exterior membrane may include fibers impregnated with first material 116. Exterior membrane may include one or more layers of non-Newtonian gel, foam, or flexible solid material.

Figure 7:
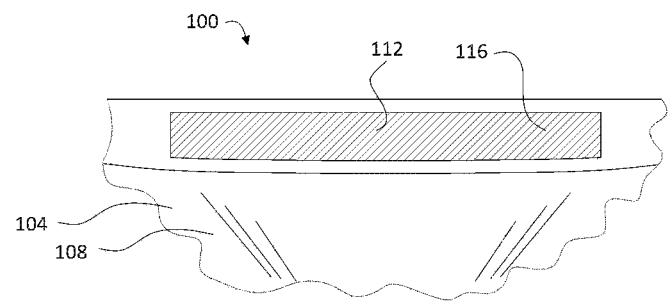
FIG. 7 is a perspective drawing illustrating a portion of an exemplary motile buoyancy device in an embodiment.

Referring now FIG. 7, at least a portion 112 including first material 116 may be injected into motile buoyancy apparatus 100. Injected at least a portion 112 may have any material composition of any at least a portion 112 described above in reference to FIGS. 1A-6. Injected at least a portion 112 may have any shape or collection of shapes, sections, or portions described above for at least a portion 112. Persons skilled in the art will be aware of many alternative ways in which at least a portion 112 may be incorporated in motile utility apparatus 100, including without limitation lamination, injection, molding, rapid prototyping, subtractive manufacturing processes such as machining, application of surface coatings in single or successive layers, and any combination of those methods. The effect of injected at least a portion 112 as shown in FIG. 7, for instance, could be achieved by the successive deposition of layers of material including sections of first material 116 and at least a second material as described above, by the creation of a body of structural material such as foam with one or more cavities and injection of first material 116 into the one or more cavities, and many possible other variations.

As illustrated for example further below, first material 116 may be incorporated in other portions of motile buoyancy device 100 as well, including without limitation at least a propulsive element. At least a propulsive element may include any portion of motile buoyancy apparatus 100 that moves through the water to propel the motile buoyancy apparatus, including without limitation a propeller blade, a paddle blade, one or more impellors or other elements of turbines, and the like. In some embodiments, incorporation of first material 116 in propulsive elements improves vibration control in the propulsive elements; first material 116 may improve other attributes of propulsive elements in the same manner in which first material 116 improves other attributes of other elements of motile buoyancy apparatus 100. At least a propulsive element may be attached to an extension 500 as described above; extension 500 may have greater strength and/or vibration control from incorporation of first material 116 in extension.

At least a portion may act to enhance the area elasticity of performance surface 108. This may occur due to the nature of first material in at least a portion 112. For example, where first material is dilatant, an impact tending to distort the performance surface 108 at a single point may concentrate the force of impact at that point. As a result, a high shear rate may be induced in first material beneath the point of impact, causing first material to behave as a rigid solid; this in turn may cause first material to press down on a wider region of at least a portion, which may deform across a wider area. Where nearby portions additional sublayers in at least a portion also contain first material, relatively high shear rates may tend to propagate further outward.

Introduction of non-Newtonian material in motile buoyancy apparatus 100 may confer various advantages. For instance, where first material 116 is a dilatant material, performance surface 108 incorporating first material 116 may exhibit increased shear resistance as shear rates increase. Thus, the strength of performance surface 108 to resist impact or quick onset of loads, and deformation resulting from impact or quick onset of loads, may also increase. This may enable motile buoyancy apparatus 100 to have a greater strength for a given weight, permitting the construction of a lighter motile buoyancy apparatus 100; for example, and without limitation, canoes, kayaks, surfboards, and the like may be built lighter to permit easier transport and maneuverability without sacrificing durability. Ships, working vessels such as fishing boats, and the like may be able to resist unusual impacts such as those presented by rogue waves, reefs, or other nautical hazards using the enhanced strength provided by first material 116. High-performance surfaces that may be prone to breaking under severe stresses may also be strengthened by dilatant first material 116 to decrease the chance of failure.

Where first material 116 is a shear-thinning material, first material may be used to make performance surface 108 more flexible when subjected to increased shear rates. In some embodiments, an ability of performance surface 108 to absorb energy by flexing may be a desirable way to reduce damage incurred in some impacts. In some embodiments, first material 116 may be dilatant in some locations or layers within motile buoyancy unit 100 and pseudoplastic in other locations or layers, allowing increased stiffness in response to some shear stresses and decreased stiffness in response to other shear stresses; for example, a pseudoplastic layer may normally not be affected by impacts, but upon a particularly rapid impact may become flexible, allowing performance surface 108 to deform without breaking, while dilatant strips or layers closer to performance surface 108 may ordinarily cause performance surface to stiffen upon impact.

Non-Newtonian first material may confer various advantages regarding vibration control. Where first material is a dilatant material, higher shear rates induced by higher amplitude oscillations may cause first material to stiffen further, increasing overall damping of oscillation, and particularly resisting movement of oscillation at points during which oscillation is at peak kinetic energy, and therefore peak velocity; this may dampen oscillation to a negligible level far more rapidly for a given quantity of damping material, permitting first material to be used in smaller amounts than conventional damping material. As a result, motile buoyancy apparatus 100 may be built using less overall quantities of material, improving cost-effectiveness of construction where vibration reduction is needed. Furthermore, performance surface 108 at a given thickness may be more effective at damping oscillation.

Certain embodiments of a motile buoyancy apparatus incorporating a non-Newtonian material have been described herein. Described and depicted embodiments are presented herein for illustrative purposes only, to aid in understanding the disclosed motile buoyancy apparatus, and are not intended to limit the scope of the disclosed motile buoyancy apparatus to the particular embodiments depicted or illustrated. Persons skilled in the art, upon reading the entirety of this disclosure, will be aware of many possible alternative ways to implement motile buoyancy apparatus as disclosed, each of which are within the scope of this disclosure. Any version, embodiment, or example described above including any kind of non-Newtonian material in combination with or replacing any other material described as a component material of any version, embodiment, or example described above is further contemplated as within the scope of this disclosure. Furthermore, any motile buoyancy apparatus including a non-Newtonian material in any way is contemplated as within the scope of this disclosure. It is furthermore contemplated that in some embodiments, a non-motile buoyancy apparatus such as a buoy, personal flotation device, floating dock, floating oil rig, or the like may incorporate any layer or portion of non-Newtonian material as described above.

Referring now to FIGS. 8A-18, an exemplary embodiment of a water recreation board 800 is illustrated. Water recreation board 800 may be any board used in water board sports, including without limitation a surfboard, a stand-up paddle board or paddle board, a skimboard, a board for windsurfing, a bodyboard, a boogieboard, a kneeboard, a riverboard, a wakeboard, a board for skurfing, a board for flowriding, a board for wakeskating, a board for kitesurfing or kiteboarding, a board for wakesurfing, or a waterski. Water recreation board 800 may be a solo board, which is defined herein as any water recreation board used singly as opposed to in pairs; solo board may include without limitation a surfboard, a stand up paddle board or paddle board, a skimboard, a board for windsurfing, a bodyboard, a boogieboard, a kneeboard, a riverboard, a wakeboard, a board for skurfing, a board for flowriding, a board for wakeskating, a board for kitesurfing or kiteboarding, a board for wakesurfing, or a slalom waterski. Water recreation board 800 may be a motile buoyancy apparatus 100 as disclosed above in connection with FIGS. 1A-7. Water recreation board 800 may include a performance surface 108 as described above in connection with FIGS. 1A-7. Water recreation board 800 may include any portion 112 of first material 116 as described above.

As illustrated in FIGS. 8A-13B, water recreation board 800 may be a surfboard. Surfboard may include any form of surfboard, including without limitation longboards, shortboards, funboards, fish, guns, hybrids, alaias, bonzers, mini simmons, tow in boards, and hydroboards. Surfboard may include any projection as described above in reference to FIGS. 5A-D, including without limitation keels, ridges, fins, and hydrofoils. For example, and without limitation, as illustrated in FIG. 8B, surfboard may include a single fin 804; surfboard may include multiple fins, which may be angled in any of various directions with respect to the vertical to obtain desired results. Persons skilled in the art will be aware of many variations for the construction of a surfboard.

First material 116 may be incorporated in water recreation board 800 in any manner described above for the incorporation of first material 116 in a motile buoyancy apparatus 100. First material 116 may, for example, be incorporated any extension of water recreation board 800, including fins, keels, ridges, hydrofoils, or other extension, in any manner disclosed above for inclusion of first material in at least an extension. As a further example, as shown for example in FIGS. 8A-B, first material may be incorporated in rails 808 of a surfboard. Rails 808, as used herein, are the edges of a surfboard, which run longitudinally from the tip to the tail of the surfboard. Rails 808 may be composed of first material 116, coated with first material 116, injected with first material 116, or have first material 116 incorporated according to any means or mechanism described above for incorporation of first material 116 into a portion of motile buoyancy device. Incorporation of first material 116 into rails 808 may allow rails to be more resistant to breakage or excessive flexion in heavy surf, while allowing rails to be thin enough to cut into a wave effectively, increasing maneuverability and speed.

Figure 8A:
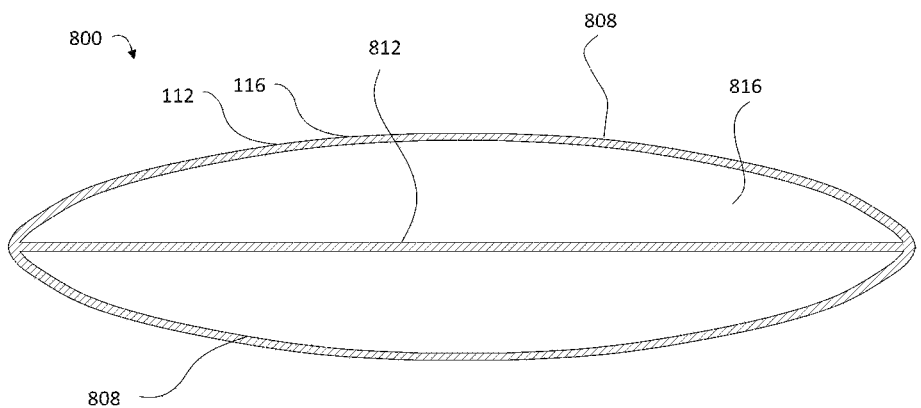
FIG. 8A is a top view illustrating an exemplary embodiment of a water recreation board in an embodiment.
Figure 8B:
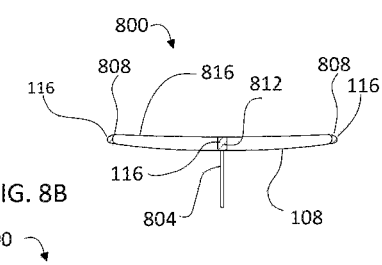
FIG. 8B is a transverse cross-sectional view of an exemplary embodiment of a water recreation board in an embodiment.

FIGS. 8A-B illustrate, respectively, a top view and a midline transverse cross-sectional view of an exemplary embodiment of a water recreation board 800, which may be a surfboard. First material 116 may be incorporated in a stringer 812, defined as a strip of material running along the axis of bilateral symmetry a surfboard, or similar water recreation board. Stringer 812 may be embedded in a deck 816, which is defined herein as the surface on which a surfer stands or is otherwise supported while using a surfboard to ride waves. Stringer 812 may be a strip embedded in deck 816, may run from the deck 816 to performance surface 108 as illustrated for example in FIG. 8B, or may have any uniform or variable depth between those extremes. Stringer 812 typically serves as a central structural element of a surfboard, providing stiffness to the board and increasing its resistance to the force of waves. Stringer 812 may incorporate first material 116 in any combination with other materials and in any other manner as disclosed above for incorporation of first material 116 in at least a portion 112 of a motile buoyancy apparatus 100; for instance, stringer 812 may include layers of first material laminated with layers of stiff material such as wood, metal, or fiberglass. In some embodiments where first material 116 is dilatant, incorporation of first material 116 in stringer 812 allows the stringer 812 to be pliable at lower speeds, for instance allowing a user to vary the rocker (front-to-back curvature) of the surfboard to perform some turns and other maneuvers, while increasing stiffness and reducing vibration when the surfboard runs at high speeds or over choppy surf.

Figure 9A:
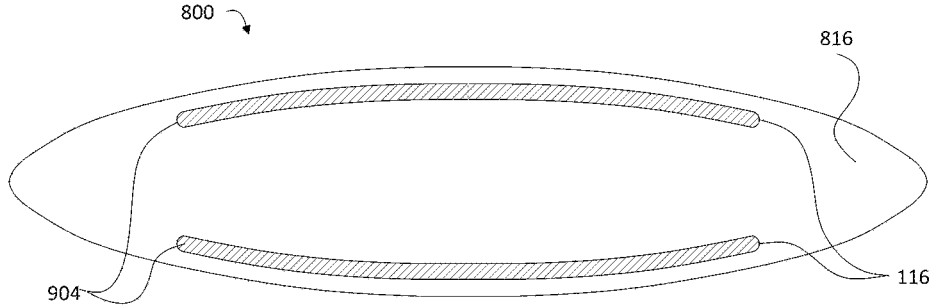
FIG. 9A is a top view illustrating an exemplary embodiment of a water recreation board in an embodiment.
Figure 9B:
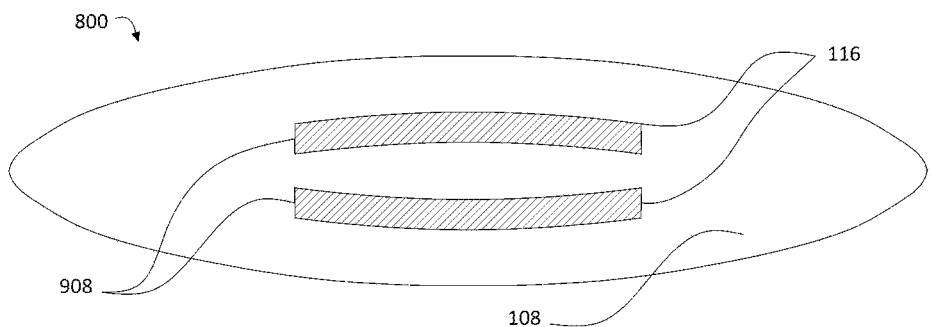
FIG. 9B is a top view illustrating an exemplary embodiment of a water recreation board in an embodiment.
Figure 9C:
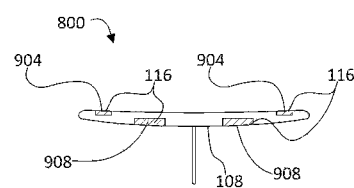
FIG. 9C is a transverse cross-sectional view of an exemplary embodiment of a water recreation board in an embodiment.

FIGS. 9A-C illustrate another exemplary embodiment of a water recreation board 800 which may be a surfboard; views of deck 816, performance surface 108, and a midline transverse cross-section of the exemplary embodiment are shown, respectively. As illustrated for example in FIG. 9A, surfboard may incorporate one or more strips 904 embedded in deck 816 that are not along the central axis of symmetry. One or more strips 904 may have any material composition or form suitable for at least a portion 112 of first material 116 included in motile buoyancy apparatus 100 as described above. One or more strips 904 may be arranged in a bilaterally symmetrical manner about the axis of symmetry. In some embodiments, as shown for example in FIG. 9A, one or more strips 904 may run lengthways in a general direction from tip to tail of surfboard. One or more strips 904 may be curved; for instance, as shown in FIG. 9A, one or more strips 904 may have a curvature presenting a convex side to the rails and a concave side to the axis of symmetry. One or more strips 904 may run the full length of the deck 816 or may run less than the full length of the deck.

As illustrated for instance in FIG. 9B, surfboard may include one or more strips 908 of first material 116 in performance surface 108; performance surface 108 may be the surface opposite the deck 816, which is submerged in the water during operation of the surfboard. One or more strips 908 in performance surface 108 may be incorporated in any manner suitable for incorporation of at least a portion 112 of first material 116 in performance surface 108 of motile buoyancy apparatus 100 as described above in reference to FIG. 1. One or more strips 908 may include a plurality of strips; for example, and without limitation, one or more strips 908 may include a plurality of strips arranged in a bilaterally symmetrical manner about a central axis of symmetry of surfboard. One or more strips 908 in performance surface 108 may have any form or position suitable for one or more strips 904 in deck 816.

As illustrated for example in FIGS. 9A-C, a water recreation board 800 may include a combination of one or more strips 904 in deck 816 and one or more strips 908 in performance surface. As a non-limiting example, water recreation board 800 may include two strips 904 embedded in deck 816 in a bilaterally symmetrical arrangement about central axis of symmetry of water recreation board 800, and two strips 908 embedded in performance surface 108 about the central axis of symmetry. Two strips 904 in deck may be placed at a different distance from central axis of symmetry than two strips 908 in performance surface 108. Each of two strips 904 in deck may have a first width, each of two strips 908 embedded in performance surface 108 may have a second width; first width may differ from second width. For instance, as shown in FIGS. 9A-C, first width may be less than second width; first width may alternatively be greater than second width. Each of two strips 904 in deck may have a first length, each of two strips 908 embedded in performance surface 108 may have a second length; first length may differ from second length. For instance, as shown in FIGS. 9A-C, first length may be greater than second length; first length may alternatively be lesser than second length. Each of two strips 904 in deck may have a first depth, each of two strips 908 embedded in performance surface 108 may have a second depth; first depth may differ from second depth. For instance, as shown in FIGS. 9A-C, first depth may be greater than second depth; first depth may alternatively be lesser than second depth. Each of two strips 904 in deck may have a first density, and each of two strips 908 embedded in performance surface 108 may have a second density; first density may differ from second density. First density may be greater than second density; second density may be greater than first density.

Figure 10A:
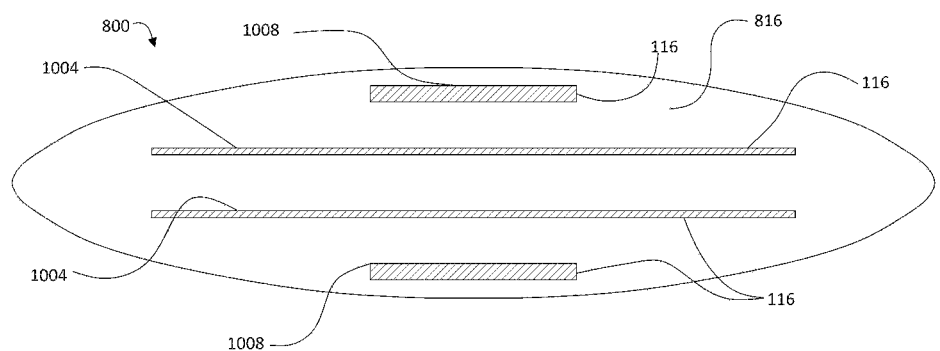
FIG. 10A is a top view illustrating an exemplary embodiment of a water recreation board in an embodiment.
Figure 10B:
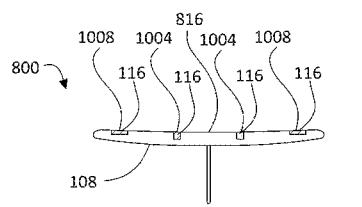
FIG. 10B is a transverse cross-sectional view of an exemplary embodiment of a water recreation board in an embodiment.

FIGS. 10A-B illustrate, respectively, a top view and midline transverse cross-sectional view of an another exemplary embodiment of a water recreation board 800, which may be a surfboard. Water recreation board 800 may include one or more strips of first material 116 in deck 816. One or more strips may include a first plurality of strips 1004 and a second plurality of strips 1008. First plurality of strips 1004 may include at least a pair of strips; at least a pair of strips may be arranged in a bilaterally symmetrical manner about a central axis of symmetry of water recreation board 800. Second plurality of strips 1008 may include at least a pair of strips; at least a pair of strips may be arranged in a bilaterally symmetrical manner about a central axis of symmetry of water recreation board 800.

Each of first plurality of strips 1004 in deck may have a first width, and each of second plurality of strips 1008 may have a second width; first width may differ from second width. For instance, as shown in FIGS. 10A-B, first width may be greater than second width; first width may alternatively be lesser than second width. Each of first plurality of strips 1004 in deck may have a first length, each of second plurality of strips 1008 may have a second length; first length may differ from second length. For instance, as shown in FIGS. 10A-B, first length may be lesser than second length; first length may alternatively be greater than second length. Each of first plurality of strips 1004 in deck may have a first depth, each of second plurality of strips 1008 may have a second depth; first depth may differ from second depth. For instance, as shown in FIGS. 10A-B, first depth may be lesser than second depth; first depth may alternatively be greater than second depth. Each of first plurality of strips 1004 may have a first density, and each of second plurality of strips 1008 may have a second density; first density may differ from second density. First density may be greater than second density; second density may be greater than first density. It should be noted that the examples illustrating incorporation of first material into water recreation board 800 herein are for illustrative purposes only, and should not be construed to exclude from the scope of this disclosure other variations, such as channels having a depth from the deck 816 to the performance surface 108, combinations of features from the above figures, or other combinations of portions and features as described above with regard to motile buoyancy apparatuses 100.

Figure 11:
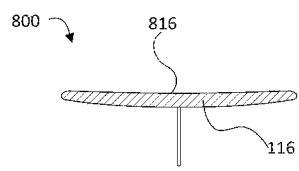
FIG. 11 is a transverse cross-sectional view of an exemplary embodiment of a water recreation board in an embodiment.

FIG. 11 illustrates another exemplary embodiment of a water recreation board 800, which may be a surfboard, shown as a midline transverse cross-section. In an embodiment, at least a portion 112 including first material 116 may include all or substantially all of water recreation board 800; for example, and without limitation, all or substantially all of water recreation board may be composed of a foam incorporating non-Newtonian material, as described above. In some embodiments, water recreation board 800 is coated or wrapped with a thin layer to waterproof, rip-proof, or give desired hydrodynamic properties to water recreation board 800.

Figure 12:
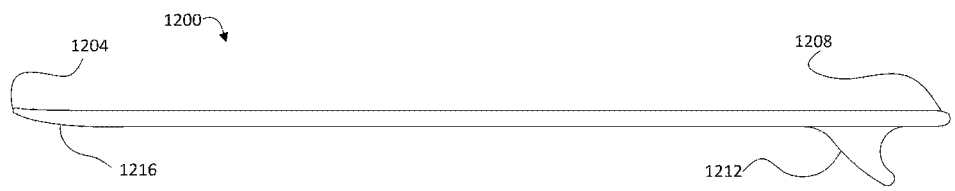
FIG. 12 is a side view of an exemplary embodiment of a water recreation board in an embodiment.

FIG. 12 illustrates an exemplary embodiment of a surfboard 1200 as seen from the side. Surfboard 1200 has a tip 1204, which is the end that precedes the surfboard 1200 in its passage through water. Surfboard 1200 has a tail 1208, which is the opposite end of surfboard 1200 from tip. Surfboard 1200 may have one or more fins 1212 or other projections for stability and steering in water. Surfboard 1200 may have a rocker 1216, which is a curvature of performance surface 108 of the surfboard 1200; the rocker 1216 may also induce a curvature in deck 816 of the surfboard. A surfboard may be produced by a variety of processes, either singly or in combination, each of which may be also be used for water recreation boards and/or solo boards as described herein. Surfboards may be built by forming a core. Core may be a central structure of the surfboard; core may have a shape similar to the completed surfboard. Core may be the completed surfboard; for instance, an entire surfboard may be formed of a single material such as wood or foam. Traditional surfboards were originally formed of a single piece of wood, as a non-limiting example. Core may form essentially the entire surfboard; that is, the entire surfboard may be formed of the core with a surface treatment or thin wrapper about the core. Treatments may include varnishing and/or coating of the surface to render it smoother or more waterproof. Wrappers may be formed of fiberglass, aramid fiber, carbon fiber, graphene, or other materials that may imbue toughness, waterproofing, or hydrodynamic properties to performance surface 108. As noted above, first material 116 may be incorporated in core, treatments of core surface, wrappers, or any combination thereof. Core may include a stringer 812 as described above. Core may be formed about stringer 812 or without stringer by molding, deposition of successive layers vertically, horizontally, or radially, additive manufacturing, or subtractive processes such as cutting, shaping, and sanding.

Still viewing FIG. 12, surfboard 1200 may be constructed of additional layers or portions of material, which may be arranged about core, or stringer. For instance, strips, sections, or portions of material may be attached to other portions of surfboard 1200. Strips, sections, or portions of material may be embedded in cavities in other portions of surfboard 1200; cavities may be enclosed or opened, and may be created by hollowing out the cavities in the other portions, leaving cavities when constructing the other portions, or covering over cavities with additional layers, as well as any combination thereof. Embedding in cavities may be accomplished by adhesion or deposition of strips, sections or portions, by injection or pouring of materials making up strips sections or portions into cavities, or any other suitable method.

Figure 13A:
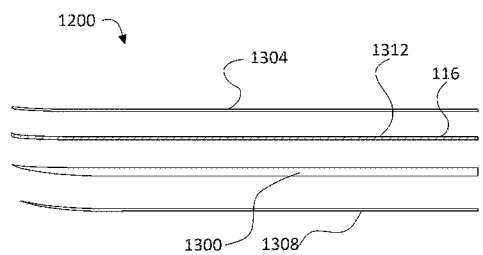
FIG. 13A is an exploded view of a portion of a water recreation board in an embodiment.
Figure 13B:
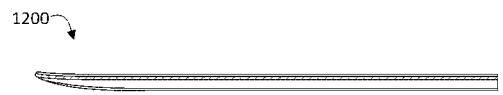
FIG. 13B is a side view of a portion of a water recreation board in an embodiment.

In some embodiments, as illustrated for example in FIGS. 13A-B, surfboard 1200 is formed at least in part by lamination of a plurality of layers together. FIG. 13A depicts an exploded view of a portion of a surfboard 1200 in an exemplary embodiment; FIG. 13B depicts the same portion assembled in an exemplary embodiment. Layers may include, without limitation, a core layer 1300. Core layer 1300 may be a layer that functions as a core as described above. Core layer may be constructed of any material or combination of materials described above as suitable for construction of motile buoyancy device 100 or water recreation board 800, including foam, wood, fiberglass or other material. Core layer 1300 may be passively buoyant. In some embodiments, core layer 1300 is the thickest layer, and may provide structural integrity to surfboard 1200. Core 1300 may incorporate non-Newtonian material. Layers may include a top layer 1304, which may be composed of any material or combination of materials suitable for construction of a buoyancy device 100 or water recreation board 800. Top layer 1304 may be composed at least in part of tear-resistant material such as carbon fiber, aramid fiber, and the like. Top layer 1304 may be composed at least in part of waterproof material, such as polymer sheets. Top layer 1304 may include non-Newtonian material. Layers may include a bottom layer 1308, which may be composed of any material or combination of materials suitable for construction of a buoyancy device 100 or water recreation board 800. Bottom layer 1308 may be composed at least in part of tear-resistant material such as carbon fiber, aramid fiber, and the like. Bottom layer 1308 may be composed at least in part of waterproof material, such as polymer sheets. Bottom layer 1308 may include non-Newtonian material. Layers may include one or more intermediate layers 1312, which may be composed of any material or combination of materials suitable for construction of a buoyancy device 100 or water recreation board 800. One or more intermediate layers 1312 may include non-Newtonian material.

Layers may be laminated together using an adhesive material such as an epoxy or epoxy resin. Layers may be sealed together by any other suitable means. One or more layers may wrap around one or more of the other layers; for instance, and without limitation, top layer 1304 and bottom layer 1308 may be a single exterior coating around other layers. Layers or partially or completely laminated structure of surfboard 1200 may be shaped further by processes such as bending, cutting and sanding. An exterior coat may be added, as may one or more projections such as fins or hydrofoils. Water recreation board 800 may alternatively be inflatable, as described above for inflatable motile buoyancy apparatus 100.

Figure 14A:
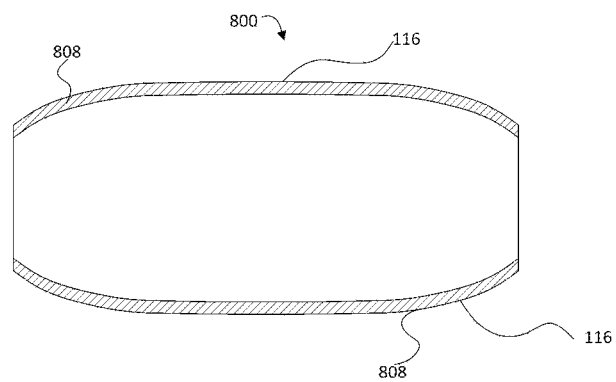
FIG. 14A is a top view illustrating an exemplary embodiment of a water recreation board in an embodiment.
Figure 14B:
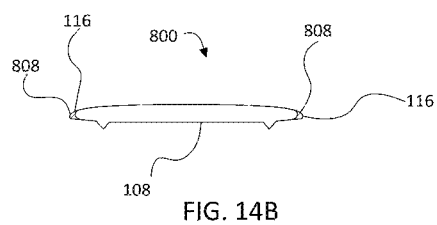
FIG. 14B is a transverse cross-sectional view of an exemplary embodiment of a water recreation board in an embodiment.

Referring now to FIGS. 14A-B, top and midline transverse cross-sectional views of an exemplary embodiment of a water recreation board 800, which may be a wakeboard, are illustrated. As noted above, water recreation board 800 may include one or more rails 808 incorporating first material 116.

Figure 15A:
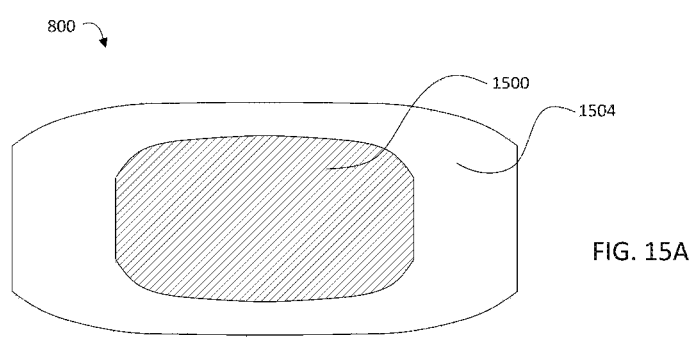
FIG. 15A is a top view illustrating an exemplary embodiment of a water recreation board in an embodiment.
Figure 15B:
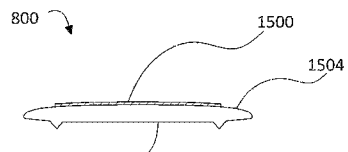
FIG. 15B is a transverse cross-sectional view of an exemplary embodiment of a water recreation board in an embodiment.

Referring now to FIGS. 15A-B, top and midline transverse cross-sectional views of an exemplary embodiment of a water recreation board 800, which may be a wakeboard, are illustrated. Water recreation board 800 may include a pad 1500 incorporating first material 116. Pad 1500 may be attached to a top surface 1504 of water recreation board. Pad 1500 may be bilaterally symmetrical about an axis of symmetry of water recreation board 800. Pad 1500 may cover all or a portion of top surface 1504. Bindings for feet or other surface elements (not shown) may be attached to pad 1500.

Figure 16:
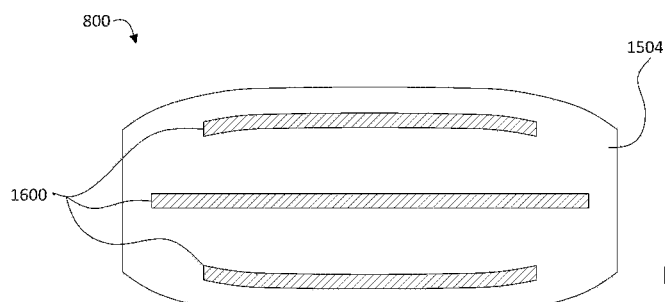
FIG. 16 is a top view illustrating an exemplary embodiment of a water recreation board in an embodiment.
Figure 17:
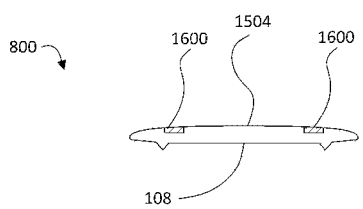
FIG. 17 is a transverse cross-sectional view of an exemplary embodiment of a water recreation board in an embodiment.

Referring now to FIGS. 16 and 17, embodiments of a water recreation board 800, which may be a wakeboard, that incorporate strips of material in top surface 1504 are illustrated. FIG. 16 is a top view of one exemplary embodiment illustrating strips 1600 in top surface 1504. FIG. 17 is a midline transverse cross-sectional view of another exemplary embodiment illustrating strips 1600 in top surface 1504. Water recreation board 800 may incorporate one or more strips 1600 embedded in top surface 1504 that are not along the central axis of symmetry. One or more strips 1600 may have any material composition or form suitable for at least a portion 112 of first material 116 included in motile buoyancy apparatus 100 as described above. One or more strips 1600 may be arranged in a bilaterally symmetrical manner about the axis of symmetry. One or more strips 1600 may run lengthways in a general direction from tip to tail of surfboard. One or more strips 1600 may be curved; for instance, one or more strips 1600 may have a curvature presenting a convex side to the rails and a concave side to the axis of symmetry. One or more strips 1600 may run the full length of the top surface 1504 or may run less than the full length of the deck.

Figure 18:
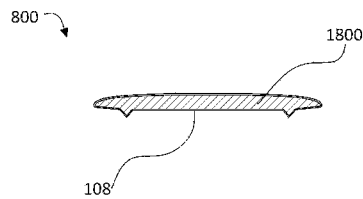
FIG. 18 is a transverse cross-sectional view of an exemplary embodiment of a water recreation board in an embodiment.

Referring to FIG. 18, an exemplary embodiment of a water recreation board 800 is illustrated, in transverse midline cross-sectional form. Water recreation board 800 may include a centrally installed portion 1800 including first material 116. Centrally installed portion 1800 may be installed according to any process described above for installing portions of material surrounded by other material. Centrally installed portion 1800 may be injected or otherwise introduced into a cavity in water recreation board 800; for instance, the exterior shape of water recreation board 800 may be formed with a hollow inside, into which centrally installed portion 1800 is injected or otherwise introduced. Centrally installed portion 1800 may alternatively be formed as a core portion by any processes described above for forming any motile buoyancy apparatus 100, water recreation board 800, or portion of water recreation board, including molding, shaping, lamination, or deposition of material; the remainder of water recreation board 800 may be formed around the centrally installed portion 800 by deposition of one or more layers of material, as described above.

Incorporation of non-Newtonian material in a water recreation board 800 as disclosed above may confer various advantages. In addition to advantages described above for incorporation of non-Newtonian material in a motile buoyancy apparatus 100, incorporation of strips of non-Newtonian material in rails, deck, performance surface, stringer, or core of a water recreation board may enable designers and users of water recreation boards to take advantages in variations in flexibility and stiffness of the non-Newtonian material under different circumstances to achieve two or more performance goals simultaneously. For instance, certain maneuvers may be performed more deftly by a flexible board, while a stiff board may be necessary to hold to a course at high velocity or on rougher water; where non-Newtonian material is a dilatant material, a water recreation board may be flexible under slower shear rates and stiff under high shear rates, allowing a combination of expert terms and handling at high velocity that previously was unattainable. Similarly, inclusion of non-Newtonian material in water recreation boards may enable designers or users to achieve a performance goal without sacrificing robustness or durability. As a non-limiting example, boards built for high speeds may be built with a very thing structure, allowing faster motion through water, but risking bent or broken boards; inclusion of dilatant material in such boards may result in greater strength when shear stresses are more powerful, alleviating the fragility of such boards.

Certain embodiments of a water recreation board incorporating a non-Newtonian material have been described herein. Described and depicted embodiments are presented herein for illustrative purposes only, to aid in understanding the disclosed water recreation board, and are not intended to limit the scope of the disclosed water recreation board to the particular embodiments depicted or illustrated. Persons skilled in the art, upon reading the entirety of this disclosure, will be aware of many possible alternative ways to implement water recreation board as disclosed, each of which are within the scope of this disclosure. Any version, embodiment, or example described above including any kind of non-Newtonian material in combination with or replacing any other material described as a component material of any version, embodiment, or example described above is further contemplated as within the scope of this disclosure. Furthermore, any water recreation board including a non-Newtonian material in any way is contemplated as within the scope of this disclosure. It is furthermore contemplated that any arrangement of materials including without limitation non-Newtonian materials, disclosed herein for a water recreation board may also be implemented for any motile buoyancy device 100 as described above.

Turning now to FIGS. 19A-F, an exemplary embodiment of a watercraft 1900 incorporating a non-Newtonian material is illustrated. Watercraft 1900 may be any water-borne vehicle. Watercraft 1900 may include, without limitation, a boat, which may be a rowboat, a racing shell such as a sculling shell or a crew boat, a canoe, a kayak, a sailboat including without limitation a single-hulled sailboat or a sailboat having multiple hulls such as a catamaran, a motor boat, which may have an outboard and/or inboard motor, a commercial boat such as a fishing boat, lobster boat, or the like, a ferry, a ship, such as a container ship, commercial fishing vessel or trawler, a specialized transport ship, a warship, or the like. Watercraft 1900 may include a submersible vehicle such as a submarine or submersible. Watercraft 1900 may include an amphibious vehicle capable of operation on both land and water.

Watercraft 1900 may be a motile buoyancy apparatus 100 as described above. Watercraft 1900 may include at least a portion 112 incorporating first material 116 as disclosed above. At least a portion 112 may be incorporated in a hull 1904 of watercraft 1900. At least a portion 112 installed in hull 1904 may cause a performance surface 108 of the hull 1904 to exhibit non-Newtonian characteristics. At least a portion 112 may be incorporated in hull 1904 in any manner for incorporation of at least a portion in outer layer 104, performance surface 108, or any other portion of motile buoyancy apparatus, including incorporation in one or more layers or sections or in the structural material of the hull itself. For instance, as illustrated by the partially cut-away side view presented in FIG. 19A, first portion 112 may incorporate one or more portions 1908 incorporated in a side of the hull 1904. As illustrated in the partially cut-away bottom view presented in FIG. 19B, first portion 112 may incorporate one or more portions 1912 incorporated in a bottom of the hull 1904. As illustrated in the partially cut-away bottom view presented in FIG. 19C, first portion 112 may incorporate one or more portions 1916 incorporated in a rear of the hull 1904. As illustrated in the partially cut-away bottom view presented in FIG. 19D, first portion 112 may incorporate one or more portions 1920 incorporated in a front, prow, or bow of the hull 1904.

Figure 19A:
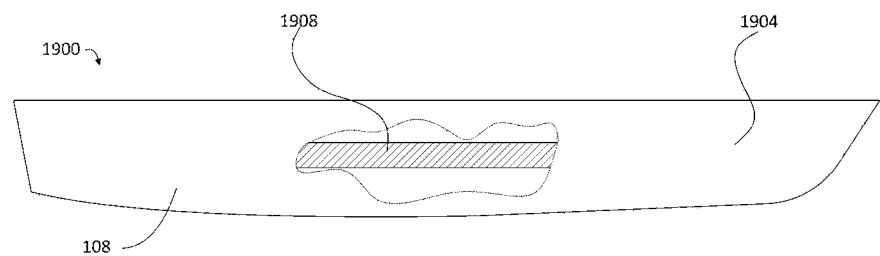
FIG. 19A is a side view illustrating an exemplary embodiment of a watercraft in an embodiment.
Figure 19B:
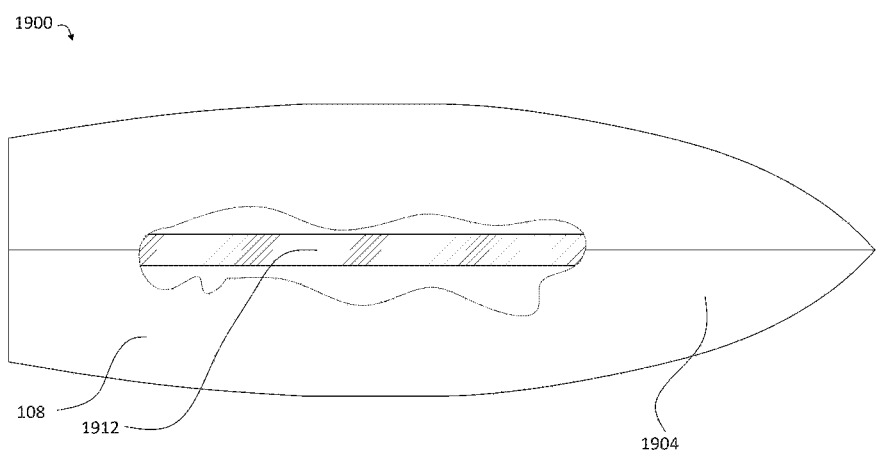
FIG. 19B is a bottom view illustrating an exemplary embodiment of a watercraft in an embodiment.
Figure 19C:
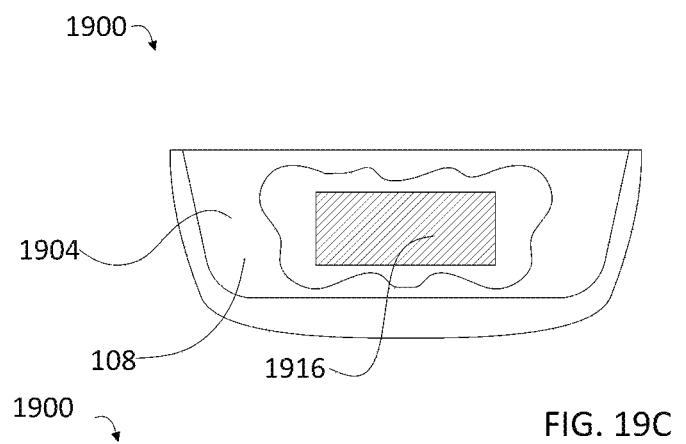
FIG. 19C is a stern view illustrating an exemplary embodiment of a watercraft in an embodiment.
Figure 19D:
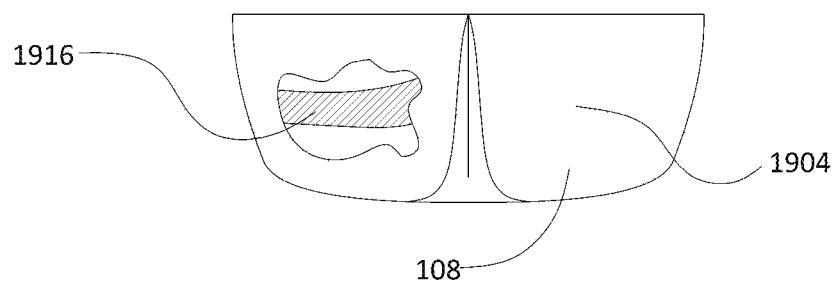
FIG. 19D is a front view illustrating an exemplary embodiment of a watercraft in an embodiment.
Figure 19E:
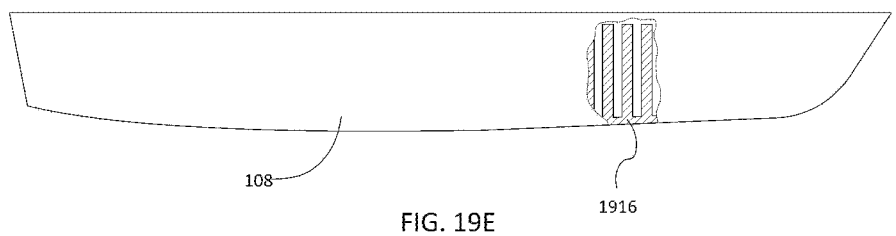
FIG. 19E is a side view illustrating an exemplary embodiment of a watercraft in an embodiment.

FIG. 19E illustrates an exemplary embodiment of a watercraft 1900 having at least a structural strength element 1916 incorporating a non-Newtonian material. At least a structural strength element 1916 may include any structural strength element described above in reference to FIGS. 1A-7, including without limitation least a rib, a keel or chine, a portion of the hull, or any combination thereof.

Figure 19F:
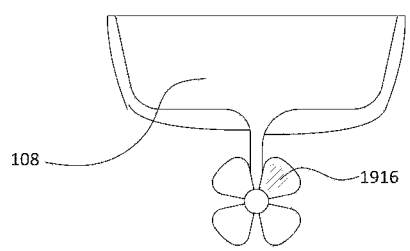
FIG. 19F is a stern view illustrating an exemplary embodiment of a watercraft in an embodiment.

FIG. 19F illustrates an exemplary embodiment of a watercraft 1900 having at least a propulsive element 1920 incorporating a non-Newtonian material. As described above in reference to FIGS. 1-7, at least a propulsive element 1290 may include any portion of at watercraft 1900 that moves through the water to propel the watercraft 1900, including without limitation a propeller blade as shown in FIG. 19F, a paddle blade, one or more impellors or other elements of turbines, and the like.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A motile buoyancy apparatus for use in a fluid, the motile buoyancy apparatus comprising:
   an outer layer, the outer layer comprising a performance surface; and
   at least a portion including a first material, wherein:
   the first material is a non-Newtonian material; and
   the at least a portion causes the performance surface to exhibit a shear rate-variable shear response.

2. The motile buoyancy apparatus of claim 1, wherein the motile buoyancy apparatus is passively buoyant.

3. The motile buoyancy apparatus of claim 1, wherein the performance surface is watertight.

4. The motile buoyancy apparatus of claim 1, wherein the performance surface is hydrodynamic.

5. The motile buoyancy apparatus of claim 1, wherein the first material further comprises a non-Newtonian foam.

6. The motile buoyancy apparatus of claim 1, wherein the first material further comprises a polymer material exhibiting non-Newtonian properties.

7. The motile buoyancy apparatus of claim 1, wherein the first material exhibits an increased shear resistance when exposed to an increased shear rate.

8. The motile buoyancy apparatus of claim 1, wherein the at least portion including the first material includes at least a portion of the performance surface.

9. The motile buoyancy apparatus of claim 8, wherein the performance surface includes at least a first portion including the first material, and at least a second portion including at least a second material.

10. The motile buoyancy apparatus of claim 8, wherein the at least a portion including the first material includes the entire performance surface.

11. The motile buoyancy apparatus of claim 1 further comprising at least an inner layer, wherein the at least a portion including the first material includes at least a portion of the at least an inner layer.

12. The motile buoyancy apparatus of claim 11, wherein the inner layer includes at least a section including the first material and at least a section including at least a second material.

13. The motile buoyancy apparatus of claim 12, wherein the at least a second material includes an elastic material.

14. The motile buoyancy apparatus of claim 11, wherein the inner layer further includes at least a first sublayer including the first material and at least second sublayer including at least a second material.

15. The motile buoyancy apparatus of claim 1, wherein:
   the motile buoyancy apparatus is bilaterally symmetrical about an axis of symmetry;
      and the at least a portion including the first material is bilaterally symmetrical about the axis of symmetry.

16. The motile buoyancy apparatus of claim 1, wherein:
   the performance surface is bilaterally symmetrical about an axis of symmetry; and
   the at least a portion including the first material is bilaterally symmetrical about the axis of symmetry.

17. The motile buoyancy apparatus of claim 16, wherein the at least a portion including the first material includes a strip of first material running along the axis of symmetry.

18. The motile buoyancy apparatus of claim 1 further comprising at least a projection that projects into the water when the motile buoyancy apparatus is placed in the water, wherein the at least a portion including the first material further comprises at least a portion of the at least a projection.

19. The motile buoyancy apparatus of claim 1 wherein the performance surface includes an edge, and the at least a portion including the first material includes at least a portion of the edge.

20. The motile buoyancy apparatus of claim 1 further comprising least a chamber having an exterior membrane, the at least a chamber containing a pressurized gas.

* * * * *